(12) United States Patent
Tamura et al.

(10) Patent No.: US 9,178,430 B2
(45) Date of Patent: Nov. 3, 2015

(54) DC/DC CONVERTER

(75) Inventors: Hideki Tamura, Shiga (JP); Kazunori Kidera, Osaka (JP); Hiroaki Koshin, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 156 days.

(21) Appl. No.: 13/814,032

(22) PCT Filed: Aug. 30, 2011

(86) PCT No.: PCT/IB2011/001980
§ 371 (c)(1),
(2), (4) Date: Feb. 4, 2013

(87) PCT Pub. No.: WO2012/035386
PCT Pub. Date: Mar. 22, 2012

(65) Prior Publication Data
US 2013/0128624 A1  May 23, 2013

(30) Foreign Application Priority Data

Sep. 15, 2010  (JP) ................................. 2010-207287

(51) Int. Cl.
  H02M 3/337  (2006.01)
  H02M 3/335  (2006.01)
  H02M 3/10   (2006.01)
  H02M 1/10   (2006.01)

(52) U.S. Cl.
  CPC ............... *H02M 3/335* (2013.01); *H02M 1/10* (2013.01); *H02M 3/337* (2013.01); *H02M 3/33569* (2013.01)

(58) Field of Classification Search
  CPC  H02M 3/33592; H02M 3/337; H02M 3/3376
  USPC .......................... 363/55, 56.01, 15–17, 95, 98
  See application file for complete search history.

(56) References Cited

U.S. PATENT DOCUMENTS

| | | | |
|---|---|---|---|
| 3,582,763 A * | 6/1971 | Huber ........................... | 363/124 |
| 5,371,455 A * | 12/1994 | Chen ............................. | 320/165 |
| 7,200,012 B1 * | 4/2007 | Hsu ............................... | 363/17 |
| 7,254,046 B2 * | 8/2007 | Kawasaki et al. ........... | 363/21.12 |
| 8,035,996 B1 * | 10/2011 | Greenfeld ...................... | 363/17 |
| 2001/0009516 A1* | 7/2001 | Kato .............................. | 363/17 |
| 2003/0157776 A1* | 8/2003 | Smith ........................... | 438/317 |

(Continued)

FOREIGN PATENT DOCUMENTS

| | | |
|---|---|---|
| CN | 101309047 | 11/2008 |
| JP | H8-228484 | 9/1996 |

(Continued)

OTHER PUBLICATIONS

Japanese Office Action for corresponding Japanese Application No. 2010-207287 dated Feb. 18, 2014 (with English summary thereof).

(Continued)

*Primary Examiner* — Timothy J Dole
*Assistant Examiner* — Bryan R Perez
(74) *Attorney, Agent, or Firm* — Renner, Otto, Boisselle & Sklar, LLP

(57) ABSTRACT

A DC/DC converter has DC input terminals to which a DC power is inputted, a transformer, and a bidirectional switching device on the primary side of the transformer.

6 Claims, 17 Drawing Sheets

(56) References Cited

U.S. PATENT DOCUMENTS

| | | | |
|---|---|---|---|
| 2008/0013351 A1* | 1/2008 | Alexander | 363/123 |
| 2008/0094859 A1* | 4/2008 | Takayanagi et al. | 363/17 |
| 2009/0154200 A1* | 6/2009 | Coccia et al. | 363/21.02 |
| 2009/0322454 A1 | 12/2009 | Tanaka et al. | |
| 2009/0323380 A1* | 12/2009 | Harrison | 363/126 |
| 2012/0250369 A1* | 10/2012 | Furukawa | 363/25 |

FOREIGN PATENT DOCUMENTS

| | | |
|---|---|---|
| JP | H9-47022 | 2/1997 |
| JP | 2009-284721 | 12/2009 |
| JP | 2010-4697 | 1/2010 |
| JP | 2010-22077 | 1/2010 |
| JP | 2010-207287 | 1/2010 |

OTHER PUBLICATIONS

International Search Report for corresponding International Application No. PCT/IB2011/001980 mailed Jan. 17, 2012.

Form PCT/ISA/237 for corresponding International Application No. PCT/IB2011/001980 dated Jan. 17, 2012.

Masanori Konakawa, Etoki de Wakaru Power Electronics, Ohmsha, Ltd., Apr. 10, 2001, pp. 111 to 115 and English Abstract.

English translation of the Chinese Search Report issued in a corresponding Chinese application No. 201180038935.3.

Japanese Office Action dated Nov. 18, 2014 issued in a corresponding Japanese application No. 2010-207287 and the English summary thereof.

\* cited by examiner

CASE A

CASE B

CASE A

CASE B

CASE A

CASE B

CASE A

CASE B

CASE A

CASE B

CASE A

CASE B

CASE A

CASE B

CASE A

CASE B

CASE A

CASE B

CASE A

CASE B

CASE A

CASE B

CASE A

CASE B

DC/DC CONVERTER

FIELD OF THE INVENTION

The present invention relates to a DC/DC converter having DC input terminals.

BACKGROUND OF THE INVENTION

Conventionally, a DC/DC converter having a DC input terminal has been used to boost or drop a DC voltage and output it (see, e.g., Japanese Patent Application Publication No. 2010-022077). In such a type of the DC/DC converter having the DC input terminal, when reverse polarity is connected to the DC input terminal, an internal circuit of the converter is broken. Various configurations as shown in FIGS. 28A to 28C have been known as countermeasures against the reverse connection to the DC input terminal.

FIG. 28A illustrates the configuration in which a diode is connected in series to one input terminal, thereby preventing a voltage from being applied to the internal circuit of the DC/DC converter in reverse connection. In this configuration, when polarity is normally connected to the DC input terminal, voltage loss is always generated by a voltage drop of the connected diode. Since the voltage is not applied to the internal circuit of the DC/DC converter in the reverse connection, the DC/DC converter does not operate.

FIG. 28B illustrates the configuration in which a diode is connected from one input terminal to the other input terminal and the internal circuit is short-circuited by the diode in reverse connection, thereby preventing a voltage from being applied to the internal circuit of the DC/DC converter in the reverse connection. In this configuration, a protection circuit is additionally required to protect a circuit connected to the DC input terminal from the short-circuit current. Alternatively, this configuration is limitedly applied to a power supply, such as a solar photovoltaic power generating panel, to which current limiting acts. Also, since the voltage is not applied to the internal circuit of the DC/DC converter in the reverse connection, the DC/DC converter does not operate.

FIG. 28C illustrates the configuration in which a bridge circuit is provided in an input unit, so that a normal voltage is applied to the internal circuit of the DC/DC converter even in any one of forward and reverse connections, such as when an AC power supply is connected to the DC/DC converter. In this configuration, the DC/DC converter operates even in any one of the forward and reverse connections, but voltage loss corresponding to the voltage of two diodes included in the bridge circuit always occurs.

SUMMARY OF THE INVENTION

In view of the above, the present invention provides a DC/DC converter which can normally operate without voltage loss even in reverse connection.

In accordance with an embodiment of the present invention, there is provided a DC/DC converter including: DC input terminals to which a DC power is inputted; a transformer; a bidirectional switching unit provided on a primary side of the transformer.

The bidirectional switching unit may include a pair of bidirectional switching devices forming a half-bridge circuit.

The bidirectional switching unit may include two pairs of bidirectional switching devices forming a full-bridge circuit.

The bidirectional switching unit may include a pair of bidirectional switching devices forming a push-pull circuit.

The bidirectional switching unit may include a pair of bidirectional switching devices forming a complex resonance circuit.

One of the bidirectional switching devices may include two switching elements, and one of the two switching elements may be turned on at timing different from timing at which the other of the two switching elements is turned on.

One of the pair of bidirectional switching devices may include two switching elements, and one of the two switching elements may be turned on as soon as a switching element included in the other of the pair of bidirectional switching devices is turned off.

The DC/DC converter may further includes a pair of switching elements on a secondary side of the transformer. One switching element in the secondary side of the transformer may be configured to be always on and the other switching element in the secondary side of the transformer may be configured to be always off to perform a forward operation.

The bidirectional switching unit may be configured to have on-time longer than off-time to perform a flyback operation.

One of the bidirectional switching devices may include two switching elements, and one of the two switching elements may be always on.

The DC/DC converter may further include a polarity determination circuit connected to the DC input terminals, the DC/DC converter may be configured to control on-timing of the two switching elements included in one of the bidirectional switching devices in accordance with the polarities of the DC input terminals determined by the polarity determination circuit.

The DC/DC converter may further include a polarity determination circuit connected to the DC input terminals. The DC/DC converter may be configured to control on and off operations of the switching element in accordance with the polarities of the DC input terminals determined by the polarity determination circuit.

The bidirectional switching device may include a bidirectional switching device having a lateral transistor structure using a GaN/AlGaN structure.

In accordance with a DC/DC converter of the present invention, even in any one of forward and reverse connections of a DC power supply, a proper current can be allowed to flow into a primary side of a transformer and the DC/DC converter can normally operate without voltage loss.

DETAILED DESCRIPTION OF THE EMBODIMENTS

Figure 1:
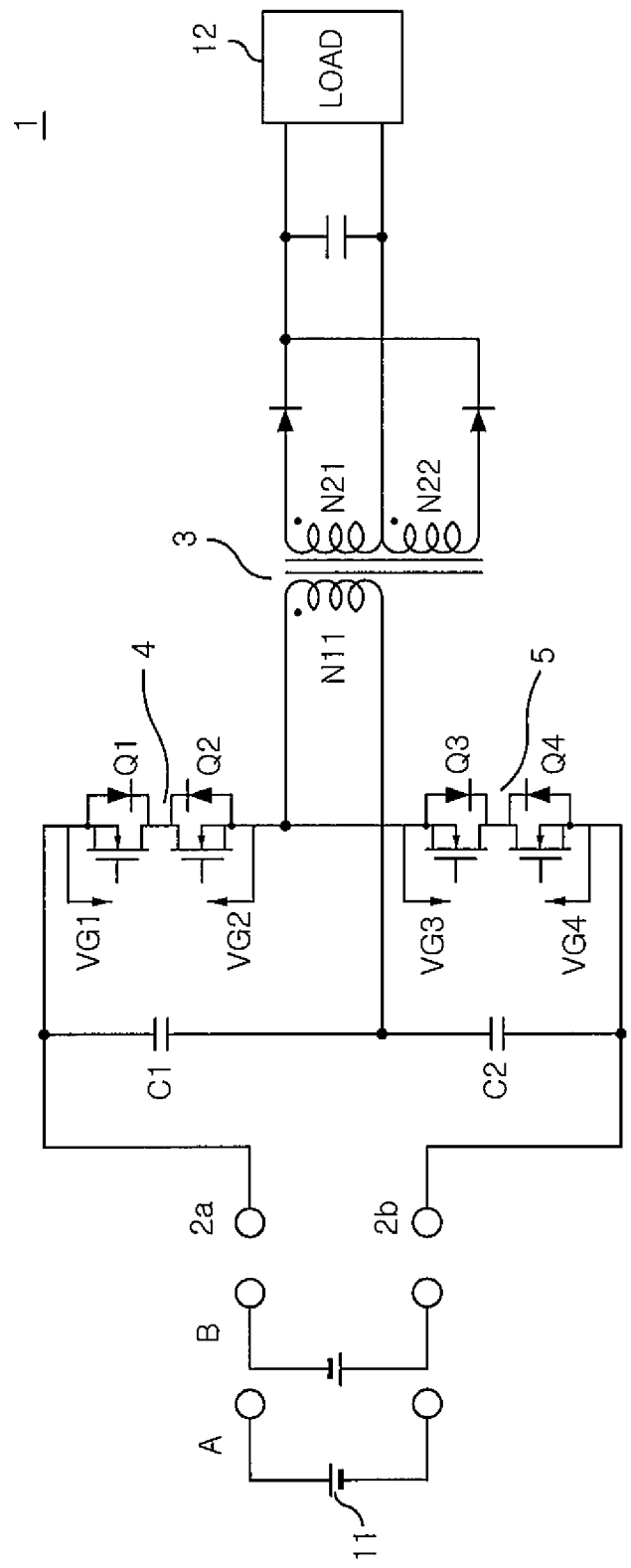
FIG. 1 is a circuit diagram of a half-bridge type DC/DC converter in accordance with an embodiment of the present invention.

Hereinafter, embodiments of the present invention will be described in detail with reference to the accompanying drawings which form a part hereof. Throughout the drawings, the same reference numerals are used to designate the same or similar elements and a redundant description thereof will be omitted.

First Embodiment

A DC/DC converter in accordance with an embodiment of the present invention will be described with reference to the accompanying drawings. For example, the DC/DC converter is built in a notebook PC. The DC/DC converter converts one DC voltage into another DC voltage and then supplies the converted DC voltage to each unit of the PC. FIG. 1 illustrates the circuit configuration of a half-bridge type DC/DC converter. The DC/DC converter 1 has a pair of DC input terminals 2a and 2b to which the voltage of a DC power supply 11 is inputted, a transformer 3 having a primary side connected to the DC input terminals 2a and 2b, a pair of bidirectional switching devices 4 and 5 on the primary side of the transformer 3, and a pair of capacitors C1 and C2. A half-bridge circuit is formed on the primary side of the transformer 3 with the transformer 3 and the bidirectional switching devices 4 and 5. The bidirectional element 4 has switching elements Q1 and Q2. The bidirectional element 5 has switching elements Q3 and Q4. A load 12 is connected to a secondary side of the transformer 3, and the DC voltage, which is converted by the transformer 3 and then smoothed, is applied to the load 12.

The DC power supply 11 is connected to the DC input terminals 2a and 2b. Hereinafter, a case where the DC power supply 11 is connected to the DC input terminals 2a and 2b with the polarity shown in A of FIG. 1 refers to forward connection, and a case where the DC power supply 11 is connected to the DC input terminals 2a and 2b with the polarity shown in B of FIG. 1 refers to reverse connection. In the DC/DC converter 1, a proper current can be allowed to flow into the primary side of the transformer 3 through the bidirectional switching devices 4 and 5 even when any one of the forward and reverse connections of the DC power supply 11 is made, as will be described below.

FIG. 2 illustrates examples of the opening-closing timing (gate voltage of each switching element) of the switching elements Q1, Q2, Q3 and Q4 included in the bidirectional switching devices 4 and 5. As a driving signal outputted from a driving circuit provided in each element is inputted to the gate, the switching elements Q1, Q2, Q3 and Q4 are turned on/off. The driving circuit outputs the driving signal based on a control signal inputted from a control circuit.

Figure 2A:
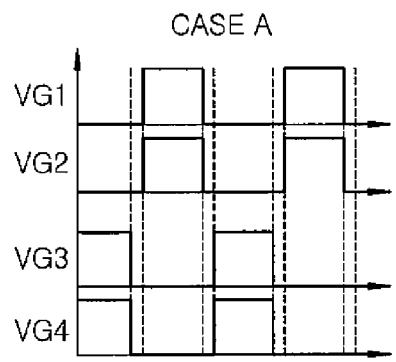
FIGS. 2A and 2B are time charts illustrating an operational example of the half-bridge type DC/DC converter.

FIG. 2A illustrates the opening-closing timing of the switching elements Q1, Q2, Q3 and Q4 when the forward connection of the DC power supply 11 is made as shown in A of FIG. 1. The switching elements Q1 and Q2 included in the bidirectional switching device 4 are switched on/off repeatedly at the same timing. Further, the switching elements Q3 and Q4 included in the bidirectional switching device 5 are switched on/off repeatedly at the same timing. The bidirectional switching device 4 and the bidirectional switching devices 5 are alternately switched on/off. That is, the switching elements Q3 and Q4 are on during the period in which the switching elements Q1 and Q2 are off, and the switching elements Q1 and Q2 are on during the period in which the switching elements Q3 and Q4 are off. When the switching elements Q1 and Q2 are on and the switching elements Q3 and Q4 are off, electric charges charged in a capacitor C1 flow through the bidirectional switching device 4 and the primary side of the transformer 3 sequentially as a current. When the switching elements Q1 and Q2 are off and the switching elements Q3 and Q4 are on, electric charges charged in a capacitor C2 flow through the primary side of the transformer 3 and the bidirectional switching device 5 sequentially as a current. By repeating these operations, the current alternately flows through the primary side of the transformer 3 in different directions.

Figure 2B:
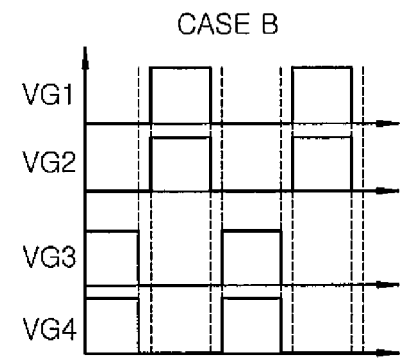

FIG. 2B illustrates the opening-closing timing of the switching elements Q1, Q2, Q3 and Q4 when the reverse connection of the DC power supply 11 is made as shown in B of FIG. 1. Even in this case, the switching elements Q1, Q2, Q3 and Q4 included in the bidirectional switching devices 4 and 5 are also switched on/off repeatedly. That is, when the switching elements Q3 and Q4 are on and the switching elements Q1 and Q2 are off, the electric charges charged in the capacitor C2 flow through the bidirectional switching device 5 and the primary side of the transformer 3 sequentially as a current. When the switching elements Q3 and Q4 are off and the switching elements Q1 and Q2 are on, the electric charges charged in the capacitor C1 flow through the primary side of the transformer 3 and the bidirectional switching device 4 sequentially as a current. By repeating these operations, the current alternately flows through the primary side of the transformer 3 in different directions.

Figure 28A:
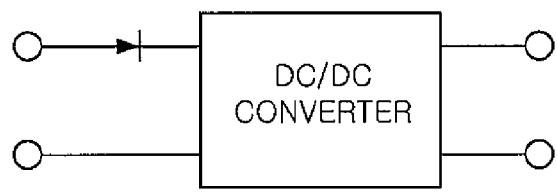
FIGS. 28A to 28C show circuit diagrams illustrating countermeasures against reverse connection of a DC power supply in a conventional DC/DC converter.
Figure 28B:
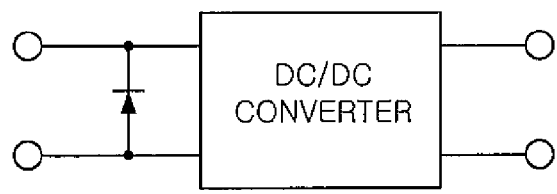
Figure 28C:
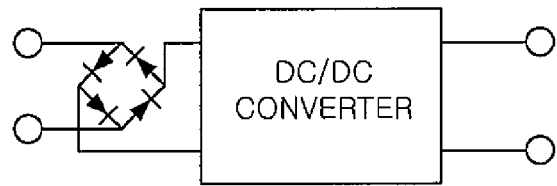

In accordance with the DC/DC converter 1, the bidirectional switching devices 4 and 5 are driven as shown in FIGS. 2A and 2B, so that a proper current can be allowed to flow into the primary side of the transformer 3 even when any one of the forward and reverse connections of the DC power supply 11 is made. Accordingly, the diodes of the input unit shown in FIGS. 28A to 28C can be removed.

When the switching elements Q1 and Q2 included in the bidirectional switching device 4 are turned on, a current flows into FETs constituting the switching elements Q1 and Q2. Similarly, when the switching elements Q3 and Q4 included in the bidirectional switching device 5 are turned on, a current flows into FETs constituting the switching elements Q3 and Q4. However, since the FETs have an on-resistance smaller than the resistance of the diodes forming the bridge circuit shown in FIG. 28C, it is possible to reduce voltage loss.

Figure 3A:
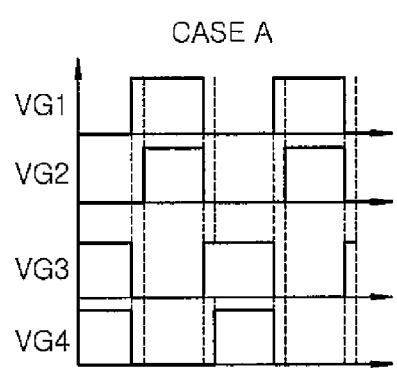
FIGS. 3A and 3B are time charts illustrating another operational example of the half-bridge type DC/DC converter.
Figure 3B:
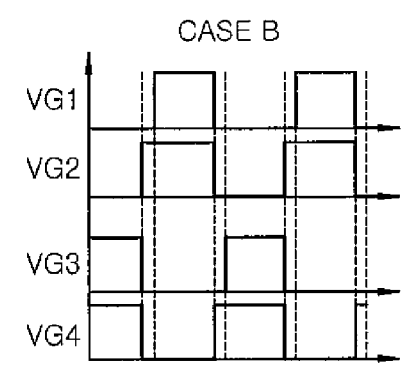

FIGS. 3A and 3B illustrate another example of the opening-closing timing of the switching elements Q1, Q2, Q3 and Q4 included in the bidirectional switching devices 4 and 5. In the operational examples, since the switching elements Q1, Q2, Q3 and Q4 have different opening-closing timings depending on whether the forward or reverse connection of the DC power supply 11 is made, a polarity determination circuit (see FIG. 22) is additionally provided.

FIG. 3A illustrates the opening-closing timing of the switching elements Q1, Q2, Q3 and Q4 when the forward connection of the DC power supply 11 is made. In this operational example, a body diode of the switching element Q2 connected to the reverse direction side of a coil is turned on in order to absorb a surge voltage when the switching element Q4 is turned off. For this reason, the on-timing of the switching element Q1 is shifted to be earlier than the on-timing of the switching element Q2 so that the on-timing of the switching element Q1 is synchronized with the off-timing of the switching element Q4. Similarly, the on-timing of the switching element Q3 is shifted to be earlier than the on-timing of the switching element Q4 so that the on-timing of the switching element Q3 is synchronized with the off-timing of the switching element Q2.

FIG. 3B illustrates the opening-closing timing of the switching elements Q1, Q2, Q3 and Q4 when the reverse connection of the DC power supply 11 is made as shown in B of FIG. 1. In this operational example, the on-timing of the switching element Q2 is shifted to be earlier than the on-timing of the switching element Q1 so that the on-timing of the switching element Q2 is synchronized with the off-timing of the switching element Q3. Similarly, the on-timing of the switching element Q4 is shifted to be earlier than the on-timing of the switching element Q3 so that the on-timing of the switching element Q4 is synchronized with the off-timing of the switching element Q1.

In accordance with these operational examples, the switching element can be protected from the surge voltage when being turned off, even if any one of the forward and reverse connections of the DC power supply 11 is made.

Figure 4A:
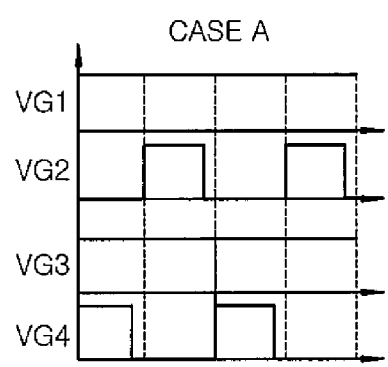
FIGS. 4A and 4B are time charts illustrating still another operational example of the half-bridge type DC/DC converter.
Figure 4B:
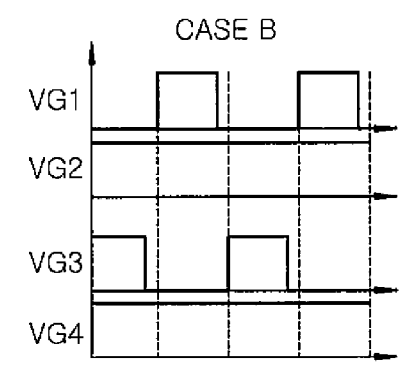

FIGS. 4A and 4B illustrate still another example of the opening-closing timing of the switching elements Q1, Q2 and Q3 and Q4 included in the bidirectional switching devices 4 and 5. In the operational examples, since the switching elements Q1, Q2, Q3 and Q4 have different opening-closing timings depending on whether the forward or reverse connection of the DC power supply 11 is made, the polarity determination circuit (see FIG. 22) is additionally provided.

FIG. 4A illustrates the opening-closing timing of the switching elements Q1, Q2, Q3 and Q4 when the forward connection of the DC power supply 11 is made as shown in A of FIG. 1. In this operational example, the switching elements Q1 and Q3 are always in an on-state. As shown in FIG. 2A, when the switching element Q2 is on and the switching element Q4 is off, the electric charges charged in the capacitor C1 flow through the bidirectional switching device 4 and the primary side of the transformer 3 sequentially as a current. When the switching element Q2 is off and the switching element Q4 is on, the electric charges charged in the capacitor C2 flow through the primary side of the transformer 3 and the bidirectional switching device 5 sequentially as a current. By repeating these operations, the current flows through the primary side of the transformer 3 in different directions.

FIG. 4B illustrates the opening-closing timing of the switching elements Q1, Q2, Q3 and Q4 when the reverse connection of the DC power supply 11 is made as shown in B of FIG. 1. In this operational example, the switching elements Q2 and Q4 are always in an on-state. As shown in FIG. 2B, when the switching element Q3 is on and the switching element Q1 is off, the electric charges charged in the capacitor C2 flow through the bidirectional switching device 5 and the primary side of the transformer 3 sequentially as a current. When the switching element Q3 is off and the switching element Q1 is on, the electric charges charged in the capacitor C1 flow through the primary side of the transformer 3 and the bidirectional switching device 4 sequentially as a current.

In accordance with these operational examples, any one of the switching elements Q1 and Q2 included in the bidirectional switching device 4 and any one of the switching elements Q3 and Q4 constituting the bidirectional switching device 5 are always in an on-state. Thus, although the bidirectional switching devices 4 and 5 increase their losses when being controlled, the control thereof can be simplified to reduce the cost of the control circuit.

(Modification)

Figure 5:
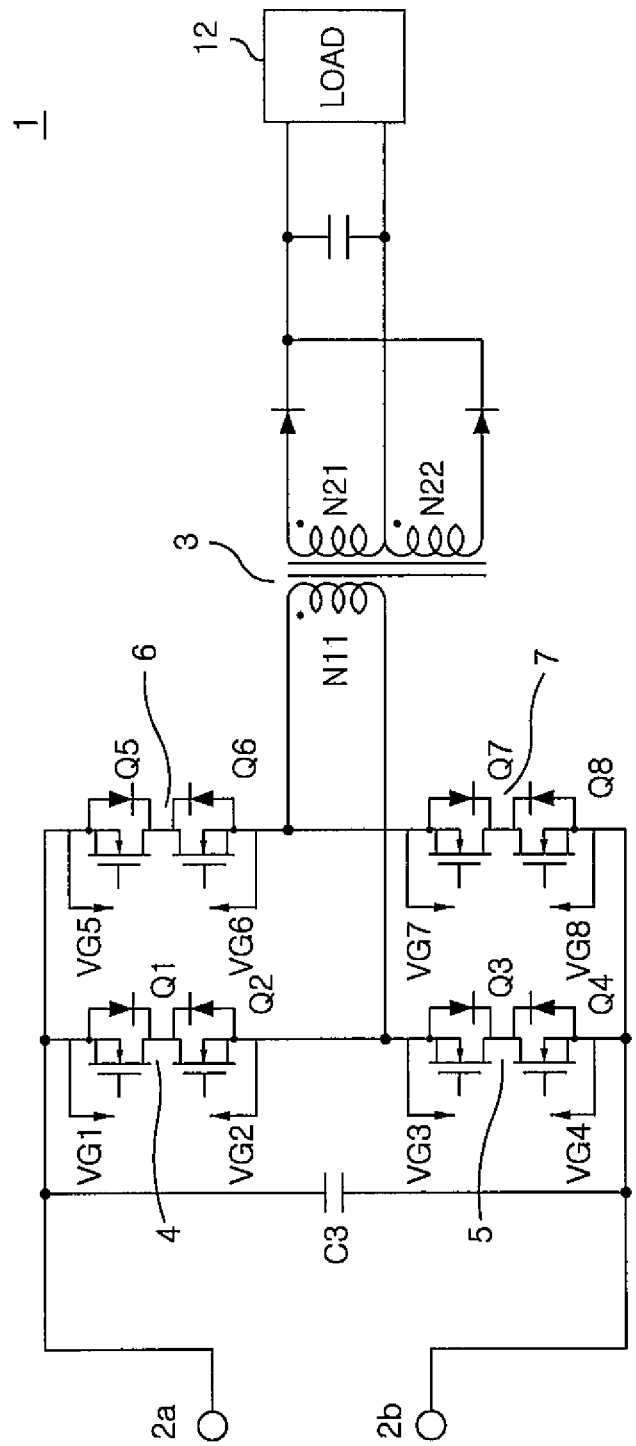
FIG. 5 is a circuit diagram of a full-bridge type DC/DC converter in accordance with a modification of the embodiment.

FIG. 5 illustrates a full-bridge type DC/DC converter as a modification of the circuit configuration of the DC/DC converter. The full-bridge type DC/DC converter 1 has a pair of DC input terminals 2a and 2b, a transformer 3, two pairs of bidirectional switching devices 4, 5, 6 and 7 on a primary side of the transformer 3, and a capacitor C3. A full-bridge circuit is formed on the primary side of the transformer 3 by the transformer 3 and the bidirectional switching devices 4, 5, 6 and 7. The bidirectional switching device 4 has switching elements Q1 and Q2. The bidirectional switching device 5 has switching elements Q3 and Q4. The bidirectional switching device 6 has switching elements Q5 and Q6. The bidirectional switching device 7 has switching elements Q7 and Q8. The load 12 is connected to a secondary side of the transformer 3, and the DC voltage, which is converted by the transformer 3 and then smoothed, is applied to the load 12.

Figure 6A:
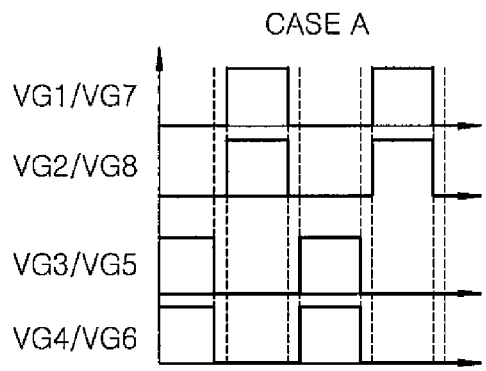
FIGS. 6A and 6B are time charts illustrating an operational example of the full-bridge type DC/DC converter.
Figure 6B:
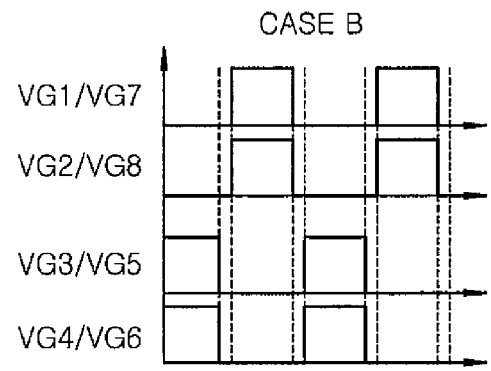

FIGS. 6A and 6B illustrate an example of the opening-closing timing of the switching elements Q1 to Q8 included in the bidirectional switching devices 4, 5, 6 and 7.

FIG. 6A illustrates the opening-closing timing of the switching elements Q1 to Q8 in the DC/DC converter 1 of FIG. 5 when the forward connection of the DC power supply 11 is made as shown in A of FIG. 1. The switching elements Q1, Q2, Q7 and Q8 included in the bidirectional switching devices 4 and 7 are switched on/off repeatedly at the same timing. In the meantime, the switching elements Q3, Q4, Q5 and Q6 included in the bidirectional switching devices 5 and 6 are switched on/off repeatedly at the same timing. That is, the bidirectional switching devices 4 and 7 are switched on/off repeatedly at the same timing as each other. Similarly, the bidirectional switching devices 5 and 6 are switched on/off repeatedly at the same timing as each other. Also, the bidirectional switching devices 4 and 5 are switched on/off alternately and repeatedly. Similarly, the bidirectional switching devices 6 and 7 are switched on/off alternately and repeatedly.

That is, the switching elements Q3, Q4, Q5 and Q6 are on during the period in which the switching elements Q1, Q2, Q7 and Q8 are off, and the switching elements Q1, Q2, Q7 and Q8 are on during the period in which the switching elements Q3, Q4, Q5 and Q6 are off. When the switching elements Q1, Q2, Q7 and Q8 are on and the switching elements Q3, Q4, Q5 and Q6 are off, a current flows from the DC power supply 11 through the bidirectional switching device 4, the primary side of the transformer 3, and the bidirectional switching device 7 sequentially, and returns back to the DC power supply 11. When the switching elements Q1, Q2, Q7 and Q8 are off and the switching elements Q3, Q4, Q5 and Q6 are on, a current flows from the DC power supply 11 through the bidirectional switching device 6, the primary side of the transformer 3, and the bidirectional switching device 5 sequentially, and returns back to the DC power supply 11. By repeating these operations, the current alternately flows through the primary side of the transformer 3 in different directions.

FIG. 6B illustrates the opening-closing timing of the switching elements Q1 to Q8 in the DC/DC converter 1 of FIG. 5 when the reverse connection of the DC power supply 11 is made as shown in B of FIG. 1. Even in this case, the switching elements Q1 to Q8 included in the bidirectional switching devices 4, 5, 6 and 7 are also switched on/off repeatedly. That is, when the switching elements Q3, Q4, Q5 and Q6 are on and the switching elements Q1, Q2, Q7 and Q8 are off, a current flows from the DC power supply 11 through the bidirectional switching device 5, the primary side of the transformer 3, and the bidirectional switching device 6 sequentially, and returns back to the DC power supply 11. When the switching elements Q3, Q4, Q5 and Q6 are off and the switching elements Q1, Q2, Q7 and Q8 are on, a current flows from the DC power supply 11 through the bidirectional switching device 7, the primary side of the transformer 3, and the bidirectional switching device 4 sequentially, and returns back to the DC power supply 11. By repeating these operations, the current alternately flows into the primary side of the transformer 3 in different directions.

In accordance with the DC/DC converter 1 of this modification, the bidirectional switching devices 4, 5, 6 and 7 are driven as shown in FIGS. 6A and 6B, so that an appropriate current can be allowed to flow into the primary side of the transformer 3 even when any one of the forward and reverse connections of the DC power supply 11 is made. Accordingly, the diodes of the input unit shown in FIGS. 28A to 28C can be removed. Like the DC/DC converter 1 shown in FIG. 1, since the FETs have an on-resistance smaller than the resistance of the diodes forming the bridge circuit shown in FIG. 28C, it is possible to reduce voltage loss. Further, the full-bridge circuit is configured to apply a substantially intact voltage of the DC power supply 11 to the primary side of the transformer 3, so that the efficiency of the transformer 3 can be improved.

Figure 7A:
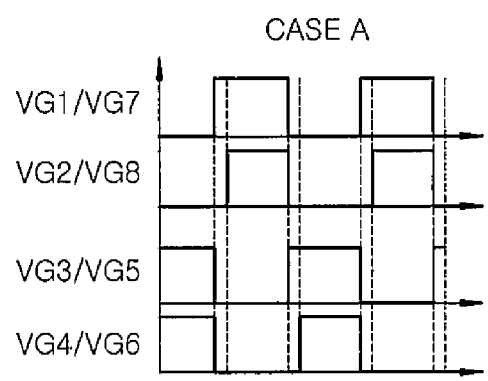
FIGS. 7A and 7B are time charts illustrating another operational example of the full-bridge type DC/DC converter.
Figure 7B:
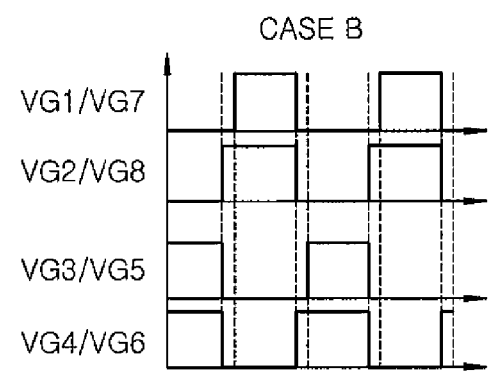

FIGS. 7A and 7B illustrate another example of the opening-closing timing of the switching elements Q1 to Q8 included in the bidirectional switching devices 4, 5, 6 and 7 in the DC/DC converter 1 of FIG. 5. In the operational examples, since the switching elements Q1 to Q8 have different opening-closing timings depending on whether the forward or reverse connection of the DC power supply 11 is made, the polarity determination circuit (see FIG. 22) is additionally provided.

FIG. 7A illustrates the opening-closing timing of the switching elements Q1 to Q8 in the DC/DC converter 1 of FIG. 5 when the forward connection of the DC power supply 11 is made as shown in A of FIG. 1. In this operational example, like the case of FIG. 3A, the on-timing of the switching elements Q1 and Q7 is shifted to be earlier than the on-timing of the switching elements Q2 and Q8 so that the on-timing of the switching elements Q1 and Q7 is synchronized with the off-timing of the switching elements Q4 and Q6. Also, the on-timing of the switching elements Q3 and Q5 is shifted to be earlier than the on-timing of the switching elements Q4 and Q6 so that the on-timing of the switching elements Q3 and Q5 is synchronized with the off-timing of the switching elements Q2 and Q8.

FIG. 7B illustrates the opening-closing timing of the switching elements Q1 to Q8 in the DC/DC converter 1 of FIG. 5 when the reverse connection of the DC power supply 11 is made as shown in B of FIG. 1. In this operational example, the on-timing of the switching elements Q2 and Q8 is shifted to be earlier than the on-timing of the switching elements Q1 and Q7 so that the on-timing of the switching elements Q2 and Q8 is synchronized with the off-timing of the switching elements Q3 and Q5. Similarly, the on-timing of the switching elements Q4 and Q6 is shifted to be earlier than the on-timing of the switching elements Q3 and Q5 so that the on-timing of the switching elements Q4 and Q6 is synchronized with the off-timing of the switching elements Q1 and Q7.

In accordance with these operational examples, the switching element can be protected from the surge voltage when being turned off even if any one of the forward and reverse connections of the DC power supply 11 is made.

Figure 8A:
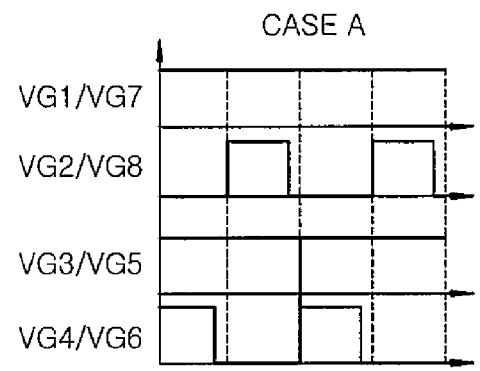
FIGS. 8A and 8B are time charts illustrating still another operational example of the full-bridge type DC/DC converter.
Figure 8B:
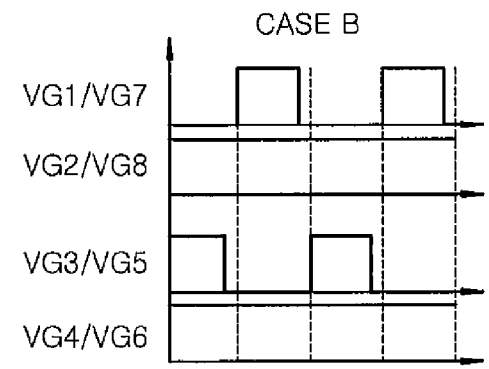

FIGS. 8A and 8B illustrate still another example of the opening-closing timing of the switching elements Q1 to Q8 included in the bidirectional switching devices 4, 5, 6 and 7 in the DC/DC converter 1 of FIG. 5. In the operational examples, since the switching elements Q1 to Q8 have different opening-closing timings depending on whether the forward or reverse connection of the DC power supply 11 is made, the polarity determination circuit (see FIG. 22) is additionally provided.

FIG. 8A illustrates the opening-closing timing of the switching elements Q1 to Q8 in the DC/DC converter 1 of FIG. 5 when the forward connection of the DC power supply 11 is made as shown in A of FIG. 1. In this operational example, as shown in FIG. 6A, the switching elements Q1, Q3, Q5 and Q7 are always in an on-state. When the switching elements Q2 and Q8 are on and the switching elements Q4 and Q6 are off, a current flows from the DC power source 11 through the bidirectional switching device 4, the primary side of the transformer 3, and the bidirectional switching device 7 sequentially, and returns back to the DC power supply 11. When the switching elements Q2 and Q8 are off and the switching elements Q4 and Q6 are on, a current flows from the DC power source 11 through the bidirectional switching device 6, the primary side of the transformer 3, and the bidirectional switching device 5 sequentially, and returns back to the DC power supply 11. By repeating these operations, the current alternately flows through the primary side of the transformer 3 in different directions.

FIG. 8B illustrates the opening-closing timing of the switching elements Q1 to Q8 in the DC/DC converter 1 of FIG. 5 when the reverse connection of the DC power supply 11 is made as shown in B of FIG. 1. In this operational example, the switching elements Q2, Q4, Q6 and Q8 are always in an on-state. Like the case of FIG. 6B, when the switching elements Q3 and Q5 are on and the switching elements Q1 and Q7 are off, a current flows from the DC power source 11 through the bidirectional switching device 5, the primary side of the transformer 3, and the bidirectional switching device 6 sequentially, and returns back to the DC power supply 11. When the switching elements Q3 and Q5 are off and the switching elements Q1 and Q7 are on, a current flows from the DC power source 11 through the bidirectional switching device 7, the primary side of the transformer 3, and the bidirectional switching device 4 sequentially, and returns back to the DC power supply 11. By repeating these operations, the current alternately flows through the primary side of the transformer 3 in different directions.

In accordance with these operational examples, any one of the switching elements Q1 and Q2 included in the bidirectional switching device 4 and any one of the switching elements Q3 and Q4 included in the bidirectional switching device 5 are always in an on-state. In addition, any one of the switching elements Q5 and Q6 included in the bidirectional switching device 6 and any one of the switching elements Q7 and Q8 included in the bidirectional switching device 7 are always in an on-state. Thus, although the bidirectional switching devices 4, 5, 6 and 7 increase their losses when being controlled, the control thereof can be simplified to reduce the cost of the control circuit.

(Modification)

Figure 9:
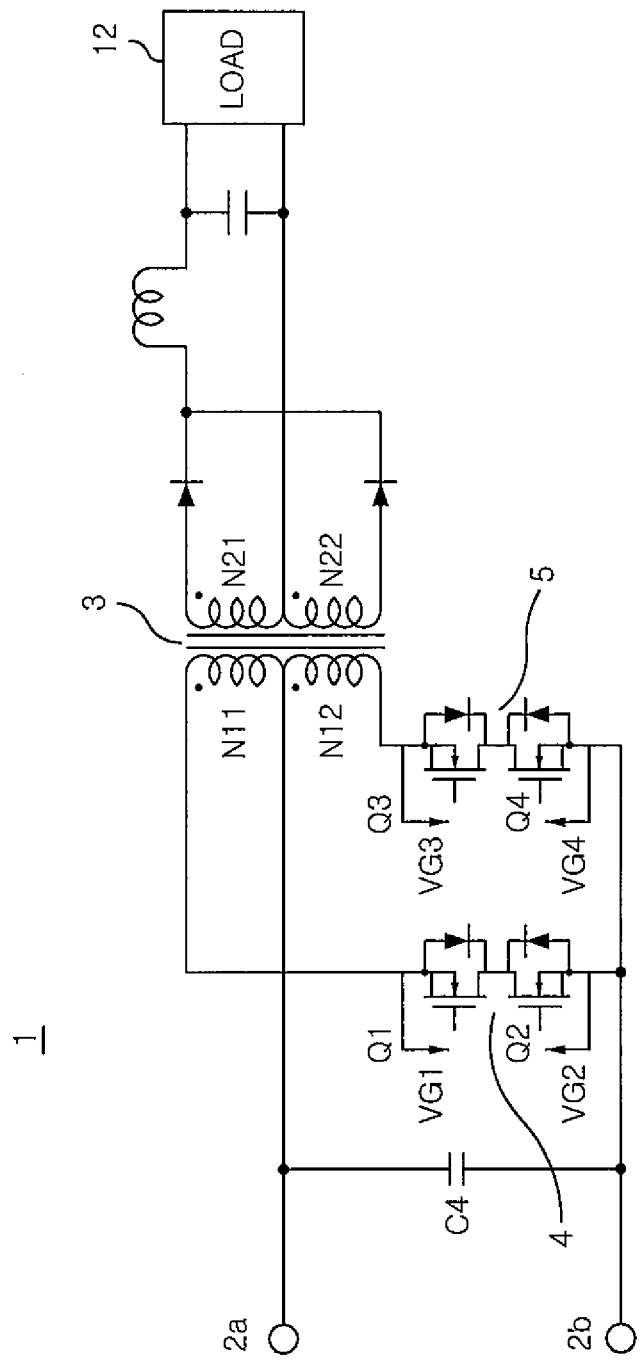
FIG. 9 is a circuit diagram of a push-pull type DC/DC converter in accordance with another modification of the embodiment.

FIG. 9 illustrates a push-pull type DC/DC converter as a modification of the circuit configuration of the DC/DC converter. The push-pull type DC/DC converter 1 has a pair of DC input terminals 2a and 2b, a transformer 3, a pair of bidirectional switching devices 4 and 5 on a primary side of the transformer 3, and a capacitor C4. A push-pull circuit is formed on the primary side of the transformer 3 by the transformer 3 and the bidirectional switching devices 4 and 5. The bidirectional switching device 4 has switching elements Q1 and Q2. The bidirectional switching device 5 has switching elements Q3 and Q4. A load 12 and, if necessary, a smoothing coil are connected to a secondary side of the transformer 3, and the DC voltage, which is converted by the transformer 3 and smoothed, is applied to the load 12.

Figure 10A:
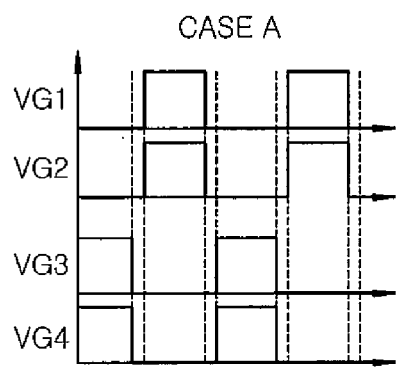
FIGS. 10A and 10B are time charts illustrating an operational example of the push-pull type DC/DC converter.
Figure 10B:
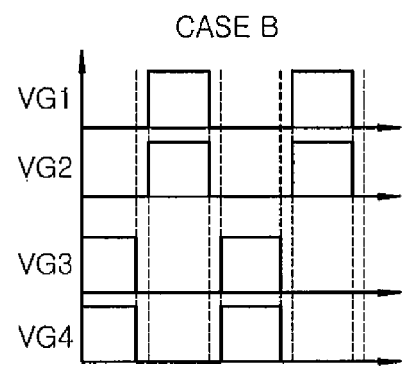

FIGS. 10A and 10B illustrate an example of the opening-closing timing of the switching elements Q1, Q2, Q3 and Q4 included in the bidirectional switching devices 4 and 5 in the DC/DC converter 1 of FIG. 9.

FIG. 10A illustrates the opening-closing timing of the switching elements Q1, Q2, Q3 and Q4 in the DC/DC converter of FIG. 9 when the forward connection of the DC power supply 11 is made as shown in A of FIG. 1. The switching elements Q1 and Q2 included in the bidirectional switching device 4 are switched on/off repeatedly at the same timing. In the meantime, the switching elements Q3 and Q4 included in the bidirectional switching device 5 are switched on/off repeatedly at the same timing. The bidirectional switching devices 4 and 5 are switched on/off alternately and repeatedly. That is, the switching elements Q3 and Q4 are on during the period in which the switching elements Q1 and Q2 are off, and the switching elements Q1 and Q2 are on during the period in which the switching elements Q3 and Q4 are off.

When the switching elements Q1 and Q2 are on and the switching elements Q3 and Q4 are off, a current flows from the DC power supply 11 through a coil N11 on the primary side of the transformer 3 and the bidirectional switching device 4 sequentially, and returns back to the DC power supply 11. When the switching elements Q1 and Q2 are off and the switching elements Q3 and Q4 are on, a current flows from the DC power supply 11 through a coil N12 on the primary side of the transformer 3 and the bidirectional switching device 5 sequentially, and returns back to the DC power supply 11. By repeating these operations, the current flows through the primary side of the transformer 3 in different directions.

FIG. 10B illustrates the opening-closing timing of the switching elements Q1, Q2, Q3 and Q4 in the DC/DC converter of FIG. 9 when the reverse connection of the DC power supply 11 is made as shown in B of FIG. 1. Even in this case, the switching elements Q1, Q2, Q3 and Q4 included in the bidirectional switching devices 4 and 5 also are switched on/off repeatedly. That is, when the switching elements Q3 and Q4 are on and the switching elements Q1 and Q2 are off, a current flows from the DC power supply 11 through the bidirectional switching device 5 and the coil N12 on the primary side of the transformer 3 sequentially, and returns back to the DC power supply 11. When the switching elements Q3 and Q4 are off and the switching elements Q1 and Q2 are on, a current flows from the DC power supply 11 through the bidirectional switching device 4 and the coil N11 on the primary side of the transformer 3 sequentially, and returns back to the DC power supply 11. By repeating these operations, the current flows through the primary side of the transformer 3 in different directions.

In accordance with the DC/DC converter 1 of this modification, the bidirectional switching devices 4 and 5 are driven as shown in FIG. 10, so that a proper current can be allowed to flow into the primary side of the transformer 3 even when any one of the forward and reverse connections of the DC power supply 11 is made. Accordingly, the diodes of the input unit shown in FIGS. 28A to 28C can be removed. Like the DC/DC converter 1 shown in FIG. 1, since the FETs have an on-resistance smaller than the resistance of the diodes forming the bridge circuit shown in FIG. 28C, it is possible to reduce voltage loss.

Figure 11A:
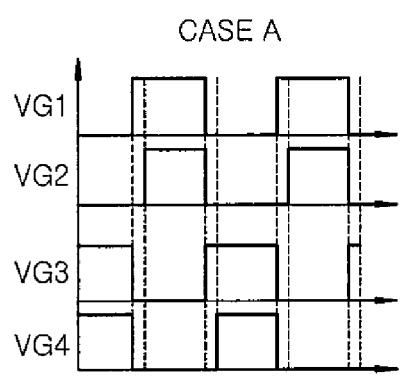
FIGS. 11A and 11B are time charts illustrating another operational example of the push-pull type DC/DC converter.
Figure 11B:
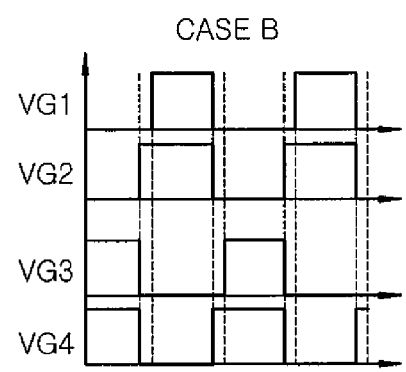

FIGS. 11A and 11B illustrate another example of the opening-closing timing of the switching elements Q1, Q2, Q3 and Q4 included in the bidirectional switching devices 4 and 5 in the DC/DC converter 1 of FIG. 9. In the operational examples, since the switching elements Q1, Q2, Q3 and Q4 have different opening-closing timings depending on whether the forward or reverse connection of the DC power supply 11 is made, the polarity determination circuit (see FIG. 22) is additionally provided.

FIG. 11A illustrates the opening-closing timing of the switching elements Q1, Q2, Q3 and Q4 in the DC/DC converter of FIG. 9 when the forward connection of the DC power supply 11 is made as shown in A of FIG. 1. In this operational example, the body diode of the switching element Q2 connected to the reverse direction side of the coil is conducted in order to absorb the surge voltage when the switching element Q4 is turned off. For this reason, the on-timing of the switching element Q1 is shifted to be earlier than the on-timing of the switching element Q2 so that the on-timing of the switching element Q1 is synchronized with the off-timing of the switching element Q4. Similarly, the on-timing of the switching element Q3 is shifted to be earlier than the on-timing of the switching element Q4 so that the on-timing of the switching element Q3 is synchronized with the off-timing of the switching element Q2.

FIG. 11B illustrates the opening-closing timing of the switching elements Q1, Q2, Q3 and Q4 in the DC/DC converter of FIG. 9 when the reverse connection of the DC power supply 11 is made as shown in B of FIG. 1. In this operational example, the on-timing of the switching element Q2 is shifted to be earlier than the on-timing of the switching element Q1 so that the on-timing of the switching element Q2 is synchronized with the off-timing of the switching element Q3. Similarly, the on-timing of the switching element Q4 is shifted to be earlier than the on-timing of the switching element Q3 so that the on-timing of the switching element Q4 is synchronized with the off-timing of the switching element Q1.

In accordance with these operational examples, the switching element can be protected from the surge voltage when being turned off even if any one of the forward and reverse connections of the DC power supply 11 is made.

Figure 12A:
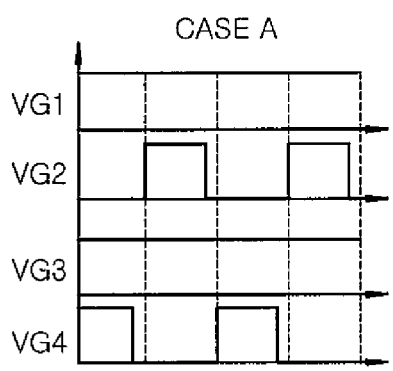
FIGS. 12A and 12B are time charts illustrating still another operational example of the push-pull type DC/DC converter.
Figure 12B:
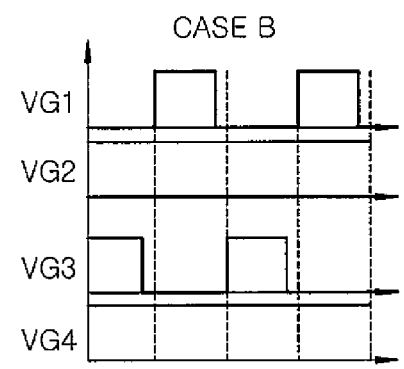

FIGS. 12A and 12B illustrate still another example of the opening-closing timing of the switching elements Q1, Q2, Q3 and Q4 included in the bidirectional switching devices 4 and 5 in the DC/DC converter 1 of FIG. 9. In the operational examples, since the switching elements Q1, Q2, Q3 and Q4 have different opening-closing timings depending on whether the forward or reverse connection of the DC power supply 11 is made, the polarity determination circuit (see FIG. 22) is additionally provided.

FIG. 12A illustrates the opening-closing timing of the switching elements Q1, Q2, Q3 and Q4 in the DC/DC converter of FIG. 9 when the forward connection of the DC power supply 11 is made as shown in A of FIG. 1. In this operational example, the switching elements Q1 and Q3 are always in an on-state. As shown in FIG. 10A, when the switching element Q2 is on and the switching element Q4 is off, a current flows from the DC power supply 11 through the coil N11 on the primary side of the transformer 3 and the bidirectional switching device 4 sequentially, and returns back to the DC power supply 11. When the switching element Q2 is off and the switching element Q4 is on, a current flows from the DC power supply 11 through the coil N12 on the primary side of the transformer 3 and the bidirectional switching device 5 sequentially, and returns back to the DC power supply 11. By repeating these operations, the current alternately flows through the primary side of the transformer 3 in different directions.

FIG. 12B illustrates the opening-closing timing of the switching elements Q1, Q2, Q3 and Q4 in the DC/DC converter of FIG. 9 when the reverse connection of the DC power supply 11 is made as shown in B of FIG. 1. In this operational example, the switching elements Q2 and Q4 are always in an on-state. As shown in FIG. 10B, when the switching element Q3 is on and the switching element Q1 is off, a current flows from the DC power supply 11 through the bidirectional switching device 5 and the coil N12 on the primary side of the transformer 3 sequentially, and returns back to the DC power supply 11. When the switching element Q3 is off and the switching element Q1 is on, a current flows from the DC power supply 11 through the bidirectional switching device 4 and the coil N11 on the primary side of the transformer 3 sequentially, and returns back to the DC power supply 11. By repeating these operations, the current alternately flows through the primary side of the transformer 3 in different directions.

In accordance with these operational examples, any one of the switching elements Q1 and Q2 included in the bidirectional switching device 4 and any one of the switching elements Q3 and Q4 included in the bidirectional switching device 5 are always in an on-state. Thus, although the bidirectional switching devices 4 and 5 increase their losses when being controlled, the control thereof can be simplified to reduce the cost of the control circuit.

(Modification)

Figure 13:
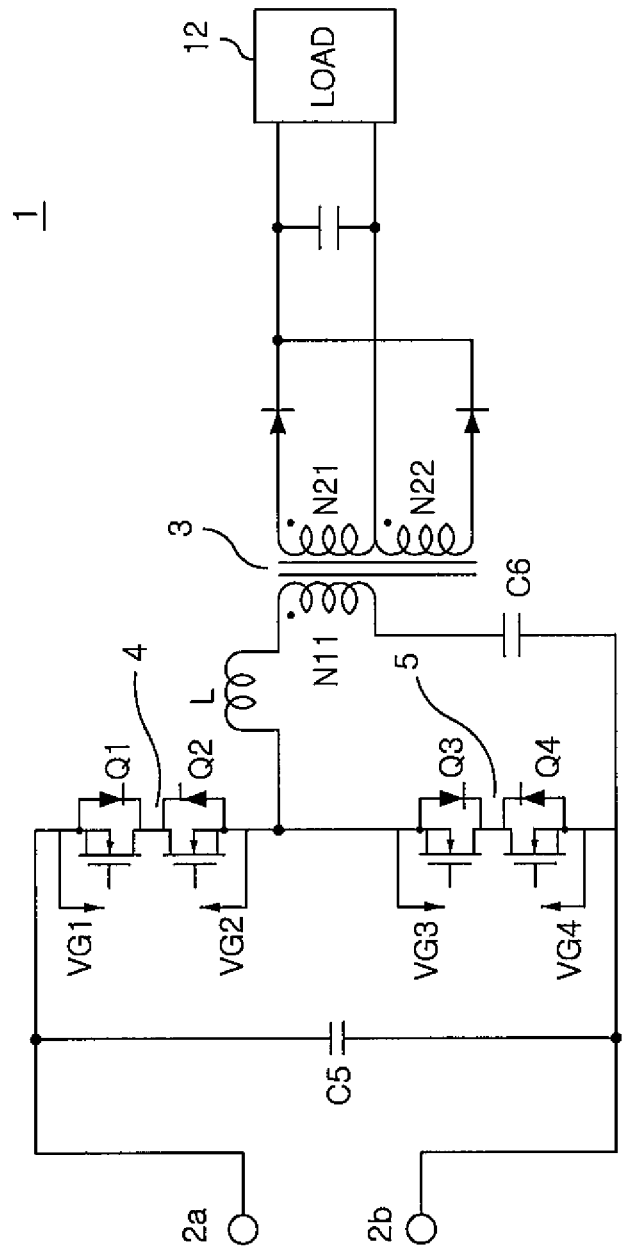
FIG. 13 is a circuit diagram of a complex resonance type DC/DC converter in accordance with still another modification of the embodiment.

FIG. 13 illustrates a complex resonance type DC/DC converter as a modification of the circuit configuration of the DC/DC converter. The complex resonance type DC/DC converter 1 has a pair of input terminals 2a and 2b, a transformer 3, a pair of bidirectional switching devices 4 and 5 on a primary side of the transformer 3, capacitors C5 and C6, and a coil L. A complex resonance circuit is formed on the primary side of the transformer 3 by the transformer 3, the bidirectional switching devices 4 and 5, the capacitor C6 and the coil L. The bidirectional switching device 4 has switching elements Q1 and Q2. The bidirectional switching device 5 has switching elements Q3 and Q4. A load 12 is connected to a secondary side of the transformer 3 and the DC voltage, which is converted by the transformer 3 and then smoothed, is applied to the load 12.

Figure 14A:
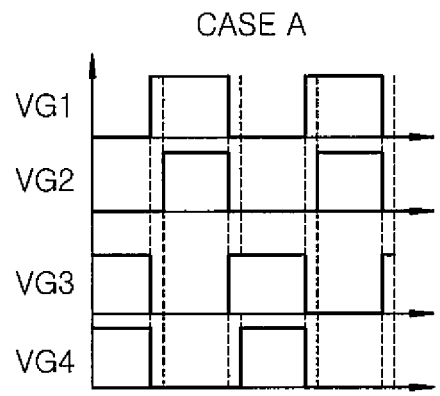
FIGS. 14A and 14B are time charts illustrating an operational example of the complex resonance type DC/DC converter.
Figure 14B:
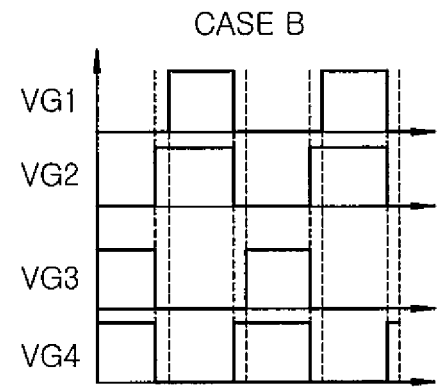

FIGS. 14A and 14B illustrate an example of the opening-closing timing of the switching elements Q1, Q2, Q3 and Q4 included in the bidirectional switching devices 4 and 5 in the DC/DC converter 1 of FIG. 13. Since the switching elements Q1, Q2, Q3 and Q4 have different opening-closing timings depending on whether the forward or reverse connection of the DC power supply 11 is made, the polarity determination circuit (see FIG. 22) is additionally provided.

FIG. 14A illustrates the opening-closing timing of the switching elements Q1, Q2, Q3 and Q4 in the DC/DC converter of FIG. 13 when the forward connection of the DC power supply 11 is made as shown in A of FIG. 1. When the switching elements Q1 and Q2 are on and the switching elements Q3 and Q4 are off, a current flows from the DC power supply 11 through the bidirectional switching device 4 and the primary side of the transformer 3 sequentially, and electric charges are charged in the capacitor C6. When the switching elements Q1 and Q2 are off and the switching elements Q3 and Q4 are on, a current flows from the capacitor C6 through the primary side of the transformer 3 and the bidirectional switching device 5 sequentially. By repeating these operations, the current alternately flows through the primary side of the transformer 3 in different directions. In this modification, in order to flow a recovery current, like the operation shown in FIG. 3A, the on-timing of the switching element Q1 is shifted to be earlier than the on-timing of the switching element Q2 so that the on-timing of the switching element Q1 is synchronized with the off timing of the switching element Q4. Similarly, the on-timing of the switching element Q3 is shifted to be earlier than the on-timing of the switching element Q4 so that the on-timing of the switching element Q3 is synchronized with the off timing of the switching element Q2.

FIG. 14B illustrates the opening-closing timing of the switching elements Q1, Q2, Q3 and Q4 in the DC/DC converter of FIG. 13 when the reverse connection of the DC power supply 11 is made as shown in B of FIG. 1. When the switching elements Q3 and Q4 are off and the switching elements Q1 and Q2 are on, a current sequentially flows through the primary side of the transformer 3 and the bidirectional switching device 4, and electric charges are charged in the capacitor C6. When the switching elements Q3 and Q4 are on and the switching elements Q1 and Q2 are off, a current flows from the capacitor C6 through the bidirectional switching device 5 and the primary side of the transformer 3 sequentially. By repeating these operations, the current alternately flows through the primary side of the transformer 3 in different directions. In this modification, in order to flow a recovery current, like the operation shown in FIG. 3B, the on-timing of the switching element Q2 is shifted to be earlier than the on-timing of the switching element Q1 so that the on-timing of the switching element Q2 is synchronized with the off timing of the switching element Q3. Similarly, the on-timing of the switching element Q4 is shifted to be earlier than the on-timing of the switching element Q3 so that the on-timing of the switching element Q4 is synchronized with the off timing of the switching element Q1.

In accordance with the DC/DC converter 1 of this modification, the bidirectional switching devices 4 and 5 are driven as shown in FIGS. 14A and 14B, so that an appropriate current can be allowed to flow into the primary side of the transformer 3 even when any one of the forward and reverse connections of the DC power supply 11 is made. Accordingly, the diodes of the input unit shown in FIGS. 28A to 28C can be removed. Like the DC/DC converter 1 shown in FIG. 1, since the FETs have an on-resistance smaller than the resistance of the diodes forming the bridge circuit shown in FIG. 28C, it is possible to reduce voltage loss. Further, the switching element can be operated under soft-switching by using a resonance phenomenon of the complex resonance circuit. Furthermore, it is possible to prevent noise and to reduce switching loss.

Figure 15A:
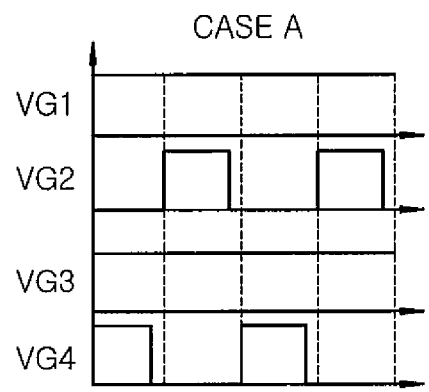
FIGS. 15A and 15B are time charts illustrating another operational example of the complex resonance type DC/DC converter.
Figure 15B:
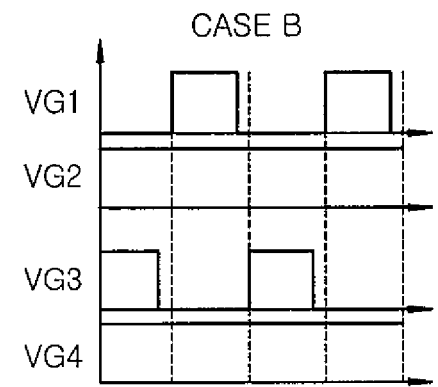

FIGS. 15A and 15B illustrate another example of the opening-closing timing of the switching elements Q1, Q2, Q3 and Q4 included in the bidirectional switching devices 4 and 5 in the DC/DC converter 1 of FIG. 13. In these operational examples, since the switching elements Q1, Q2, Q3 and Q4 have different opening-closing timings depending on whether the forward or reverse connection of the DC power supply 11 is made, the polarity determination circuit (see FIG. 22) is additionally provided.

FIG. 15A illustrates the opening-closing timing of the switching elements Q1, Q2, Q3 and Q4 in the DC/DC converter 1 of FIG. 13 when the forward connection of the DC power supply 11 is made as shown in A of FIG. 1. In this operational example, the switching elements Q1 and Q3 are always in an on-state. FIG. 15B illustrates the opening-closing timing of the switching elements Q1, Q2, Q3 and Q4 in the DC/DC converter 1 of FIG. 13 when the reverse connection of the DC power supply 11 is made as shown in B of FIG. 1. In this operational example, the switching elements Q2 and Q4 are always in an on-state. Either operation of the DC/DC converter 1 is similar to that of FIG. 14, and its description will be omitted.

In accordance with these operational examples, any one of the switching elements Q1 and Q2 included in the bidirectional switching device 4 and any one of the switching elements Q3 and Q4 included in the bidirectional switching device 5 are always in an on-state. Thus, although the bidirectional switching devices 4 and 5 increase their losses when being controlled, the control thereof can be simplified to reduce the cost of the control circuit.

(Modification)

Figure 16:
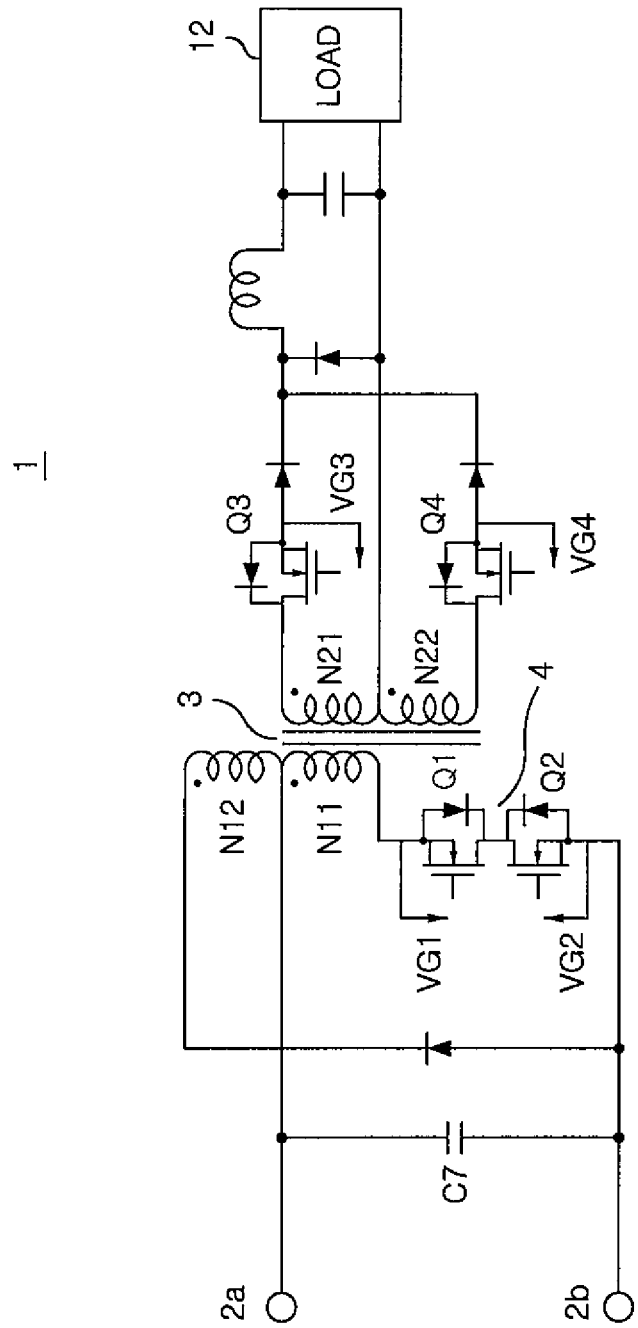
FIG. 16 is a circuit diagram of a single transistor forward type DC/DC converter in accordance with still another modification of the embodiment.

FIG. 16 illustrates a single transistor forward type DC/DC converter as a modification of the circuit configuration of the DC/DC converter. The single transistor forward type DC/DC converter 1 has a pair of DC input terminals 2a and 2b, a transformer 3, a bidirectional switching device 4 on a primary side of the transformer 3, a capacitor C7, and switching elements Q3 and Q4 on a secondary side of the transformer 3.

Figure 17A:
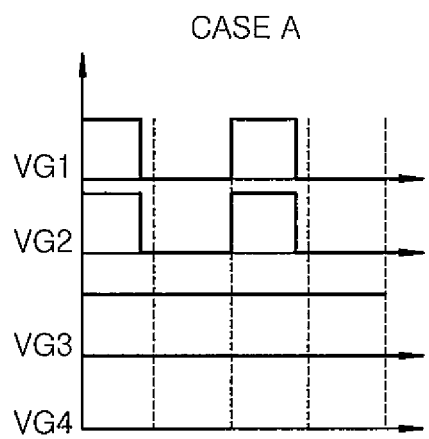
FIGS. 17A and 17B are time charts illustrating an operational example of the single transistor forward type DC/DC converter.
Figure 17B:
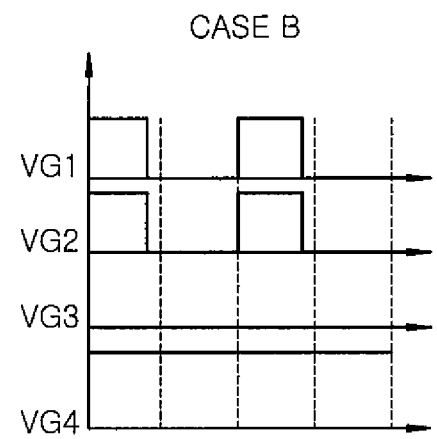

FIGS. 17A and 17B illustrate an example of the opening-closing timing of switching elements Q1 and Q2 included in the bidirectional switching device 4 and the switching elements Q3 and Q4 in the DC/DC converter 1 of FIG. 16. Since the switching elements Q1, Q2, Q3 and Q4 have different opening-closing timings depending on whether the forward or reverse connection of the DC power supply 11 is made, the polarity determination circuit (see FIG. 22) is additionally provided in the DC/DC converter 1.

FIG. 17A illustrates the opening-closing timing of the switching elements Q1, Q2, Q3 and Q4 in the DC/DC converter of FIG. 16 when the forward connection of the DC power supply 11 is made as shown in A of FIG. 1. In this operational example, the switching elements Q1 and Q2 on the primary side of the transformer 3 are simultaneously switched on/off. Further, the switching element Q3 on the secondary side of the transformer 3 is always on and the switching element Q4 on the secondary side of the transformer 3 is always off, so that a secondary side coil N22 on the flyback side is in an open-state, thereby performing a forward operation.

FIG. 17B illustrates the opening-closing timing of the switching elements Q1, Q2, Q3 and Q4 in the DC/DC converter 1 of FIG. 16 when the reverse connection of the DC power supply 11 is made as shown in B of FIG. 1. In this operational example, the switching elements Q1 and Q2 on the primary side of the transformer 3 are simultaneously switched on/off. Further, the switching element Q4 on the secondary side of the transformer 3 is always on and the switching element Q3 on the secondary side of the transformer 3 is always off, so that a secondary side coil N21 on the flyback side is in an open-state, thereby performing the forward operation.

In accordance with the DC/DC converter 1 of this modification, the bidirectional switching device 4 is driven as shown in FIGS. 17A and 17B, so that a proper current can be allowed to flow into the primary side of the transformer 3 even when any one of the forward and reverse connections of the DC power supply 11 is made. Accordingly, the diodes of the input unit shown in FIGS. 28A to 28C can be removed. Like the DC/DC converter 1 shown in FIG. 1, since the FETs have an on-resistance smaller than the resistance of the diodes forming the bridge circuit shown in FIG. 28C, it is possible to reduce voltage loss.

Figure 18A:
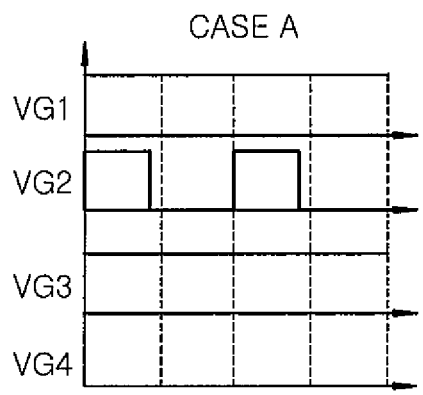
FIGS. 18A and 18B are time charts illustrating another operational example of the single transistor forward type DC/DC converter.
Figure 18B:
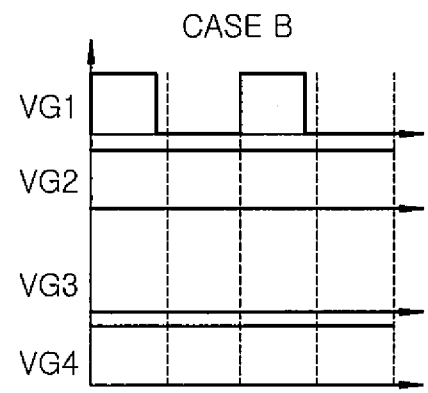

FIGS. 18A and 18B illustrate another example of the opening-closing timing of the switching elements Q1 and Q2 included in the bidirectional switching device 4 and the switching elements Q3 and Q4 in the DC/DC converter 1 of FIG. 16. In the operational examples, since the switching elements Q1, Q2, Q3 and Q4 have different opening-closing timings depending on whether the forward or reverse connection of the DC power supply 11 is made, the polarity determination circuit (see FIG. 22) is additionally provided.

FIG. 18A illustrates the opening-closing timing of the switching elements Q1, Q2, Q3 and Q4 in the DC/DC converter of FIG. 16 when the forward connection of the DC power supply 11 is made as shown in A of FIG. 1. In this operational example, the switching element Q1 on the primary side of the transformer 3 is always in an on-state. The switching element Q3 on the secondary side of the transformer 3 is always on and the switching elements Q4 on the secondary side of the transformer 3 is always off, so that the secondary side coil N22 on the flyback side is in an open-state, thereby performing the forward operation.

FIG. 18B illustrates the opening-closing timing of the switching elements Q1, Q2, Q3 and Q4 in the DC/DC converter of FIG. 16 when the reverse connection of the DC power supply 11 is made as shown in B of FIG. 1. In this operational example, the switching element Q2 on the primary side of the transformer 3 is always in an on-state. The switching element Q3 on the secondary side of the transformer 3 is always off and the switching elements Q4 on the secondary side of the transformer 3 is always on, so that the secondary side coil N21 on the flyback side is in an open-state, thereby performing the forward operation.

In accordance with these operational examples, any one of the switching elements Q1 and Q2 included in the bidirectional switching device 4 is always in an on-state. Thus, although the bidirectional switching device 4 increases its loss when being controlled, the control thereof can be simplified to reduce the cost of the control circuit.

(Modification)

Figure 19:
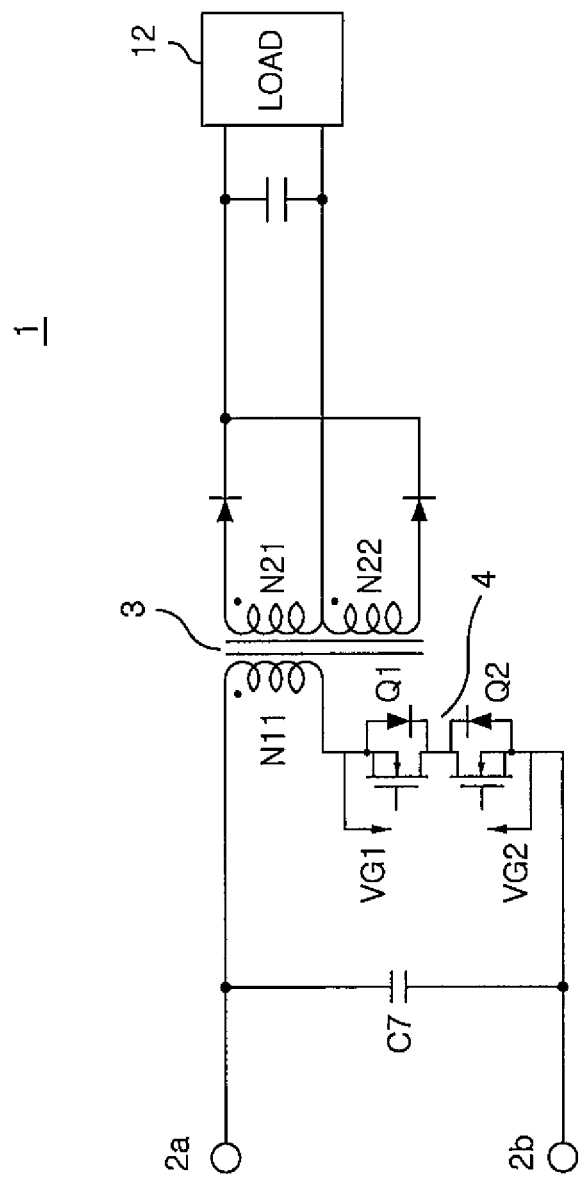
FIG. 19 is a circuit diagram of a single transistor flyback type DC/DC converter in accordance with still another modification of the embodiment.

FIG. 19 illustrates a single transistor flyback type DC/DC converter as a modification of the circuit configuration of the DC/DC converter. The single transistor flyback type DC/DC converter 1 has a pair of DC input terminals 2a and 2b, a transformer 3, a bidirectional switching device 4 on a primary side of the transformer 3, and a capacitor 7. In the DC/DC converter 1 configured as shown in FIG. 19, the output voltage Vfw at the forward side and the output voltage Vfb at the flyback side are represented by the following equations.

$$Vfw=(N21/N11)*Vin$$

$$Vfb=(N21/N11)*(Ton/Toff)*Vin$$

N11: the number of turns at a primary side of transformer
N21=N22: the number of turns at a secondary side of transformer
Ton: on-time of switching elements Q1 and Q2
Toff: off-time of switching elements Q1 and Q2
Vin: input voltage From the two equations, if the operation is performed under Ton>Toff, Vfb>Vfw and the flyback operation can be performed.

Figure 20A:
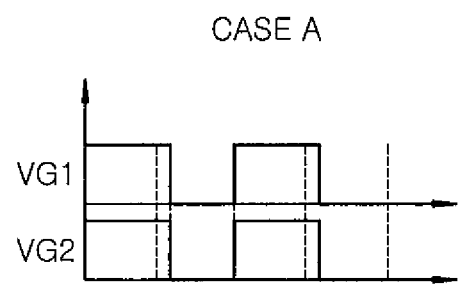
FIGS. 20A and 20B are time charts illustrating an operational example of the single transistor flyback type DC/DC converter.
Figure 20B:
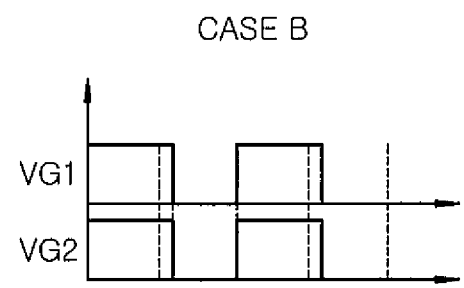

FIGS. 20A and 20B illustrate an example of the opening-closing timing of the switching elements Q1 and Q2 included in the bidirectional switching device 4 in this modification. In this modification, the switching elements Q1 and Q2 on the primary side of the transformer 3 are simultaneously on/off. Also, the on-time Ton of the switching elements Q1 and Q2 is set to be longer than the off-time Toff thereof. In the operational examples shown in FIGS. 20A and 20B, a normal operation can be performed even when any one of the forward and reverse connections of the DC power supply 11 is made, so that the polarity determination circuit is unnecessary.

In accordance with the DC/DC converter 1 of this modification, the bidirectional switching device 4 is driven as shown in FIGS. 20A and 20B, whereby the normal operation can be performed even when any one of the forward and reverse connections of the DC power supply 11 is made. Accordingly, the diodes of the input unit shown in FIGS. 28A to 28C can be removed. Like the DC/DC converter 1 shown in FIG. 1, since the FETs have an on-resistance smaller than the resistance of the diodes forming the bridge circuit shown in FIG. 28C, it is possible to reduce voltage loss.

Figure 21A:
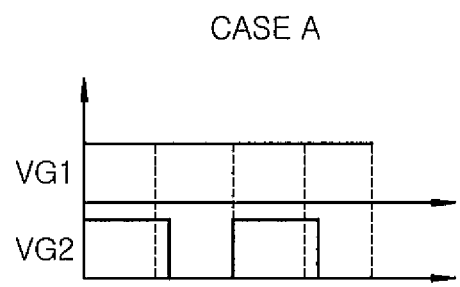
FIGS. 21A and 21B are time charts illustrating another operational example of the single transistor flyback type DC/DC converter.
Figure 21B:
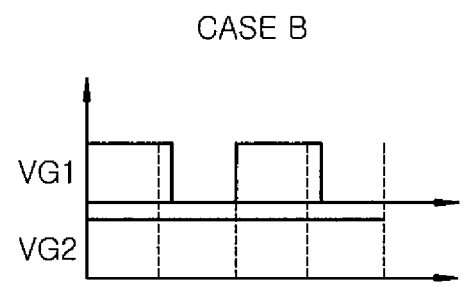

FIGS. 21A and 21B illustrate another example of the opening-closing timing of the switching elements Q1 and Q2 included in the bidirectional switching device 4 in the DC/DC converter 1 of FIG. 19. In these operational examples, since the switching elements Q1 and Q2 have different opening-closing timings depending on whether the forward or reverse connection of the DC power supply 11 is made, the polarity determination circuit (see FIG. 22) is additionally provided.

FIG. 21A illustrates the opening-closing timing of the switching elements Q1 and Q2 in the DC/DC converter 1 of FIG. 19 when the forward connection of the DC power supply 11 is made as shown in A of FIG. 1. In this operational example, the switching element Q1 on the primary side of the transformer 3 is always in an on-state. FIG. 21B illustrates the opening-closing timing of the switching elements Q1 and Q2 in the DC/DC converter 1 of FIG. 19 when the reverse connection of the DC power supply 11 is made as shown in B of FIG. 1. In this operational example, the switching element Q2 on the primary side of the transformer 3 is always in an on-state.

According to the operational example, any one of the switching elements Q1 and Q2 included in the bidirectional switching device 4 is always in an on-state. Thus, the bidirectional switching device 4 increases its loss when being controlled, but the control thereof can be simplified to reduce the cost of the control circuit.

(Modification)

Figure 22:
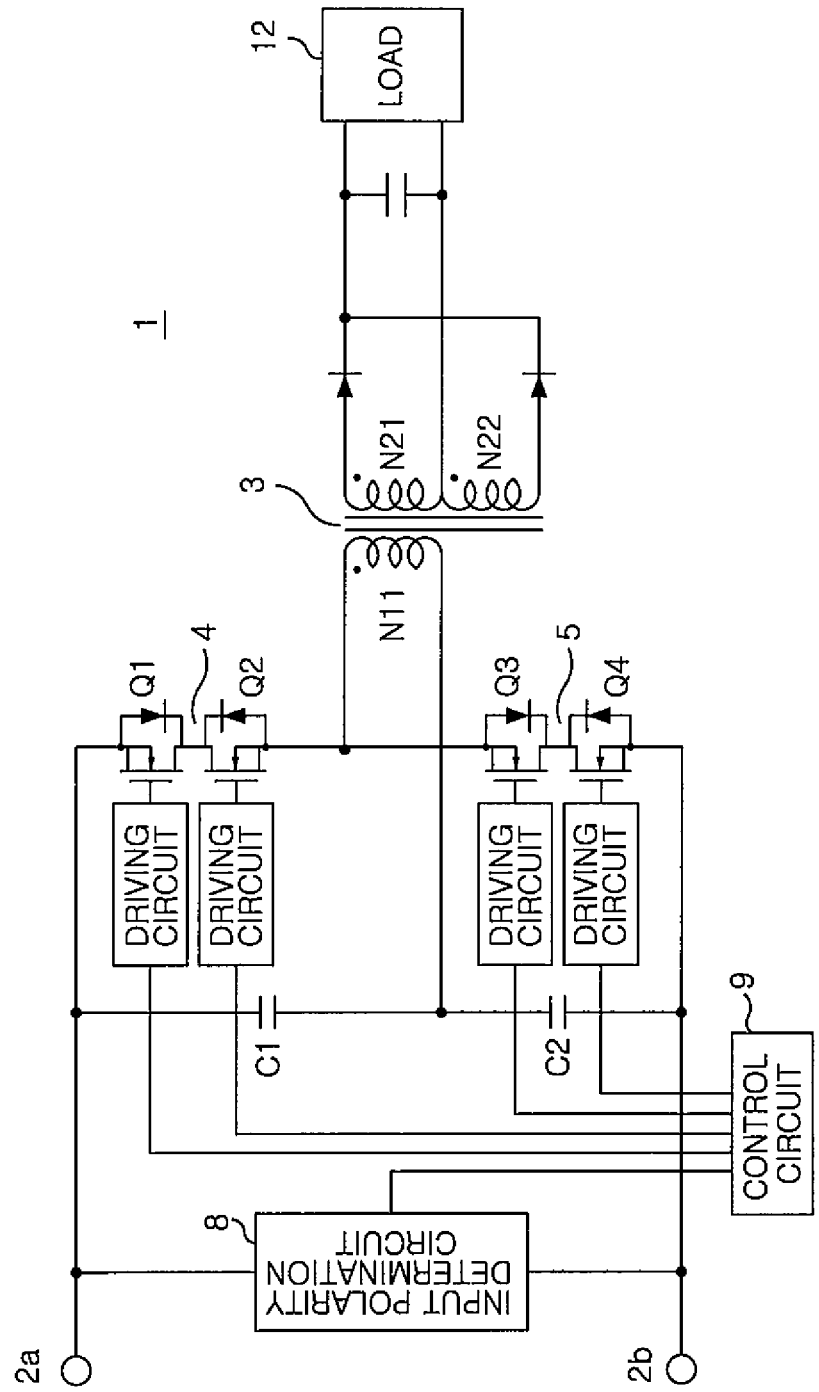
FIG. 22 is a circuit diagram of a DC/DC converter having a polarity determination circuit and the like in accordance with still another modification of the embodiment.

FIG. 22 illustrates a modification of the half-bridge type DC/DC converter shown in FIG. 1. The modified DC/DC converter 1 further has an input polarity determination circuit 8 and the like, in addition to the constitutions of the DC/DC converter of FIG. 1. The input polarity determination circuit 8 determines the polarity of the DC input terminals. A control circuit 9 outputs a control signal to the driving circuit 10 according to the polarity of the DC input terminals determined by the polarity determination circuit, and controls a driving circuit 10. The driving circuit 10 is provided with each of switching elements Q1, Q2, Q3 and Q4 included in bidirectional switching devices 4 and 5. The driving circuit 10 drives each gate of the switching elements Q1, Q2, Q3 and Q4, based on the control signal outputted from the control circuit 9.

In the operational examples shown in FIGS. 3A to 4B, the switching elements Q1, Q2, Q3 and Q4 have different opening-closing timings depending on whether the forward or reverse connection of the DC power supply 11 is made. Thus, the DC/DC converter 1 having the polarity determination circuit 8, the control circuit 9, and the driving circuit 10 is suitable. Also, the polarity determination circuit 8, the control circuit 9 and the driving circuit 10 may be applied to the DC/DC converters 1 shown in FIGS. 5, 9, 13, 16 and 19.

FIGS. 23 to 27 illustrate a bidirectional switching device 100 having a lateral transistor structure, which is applicable to the bidirectional switching devices 4, 5, 6 and 7 included in the DC/DC converter 1 in accordance with the embodiments of the present invention. The bidirectional switching device having the lateral transistor structure using a GaN/AlGaN structure has no loss due to a diode structure, and the loss thereof is low as compared with an FET. Further, it is possible to implement the integration of the control circuit. Hereinafter, the bidirectional switching device 100 having the lateral transistor structure using a GaN/AlGaN structure will be described in detail.

Figure 23:
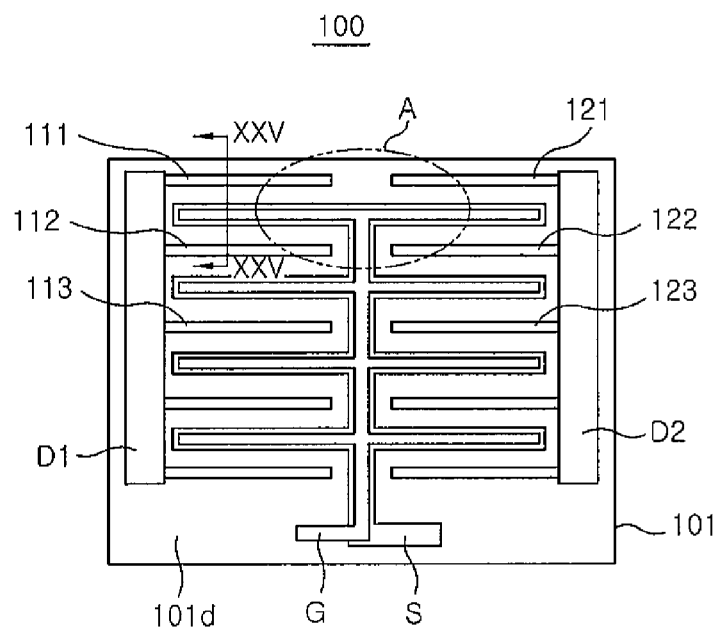
FIG. 23 is a plane view illustrating the configuration of a bidirectional switching device (single gate)
Figure 24:
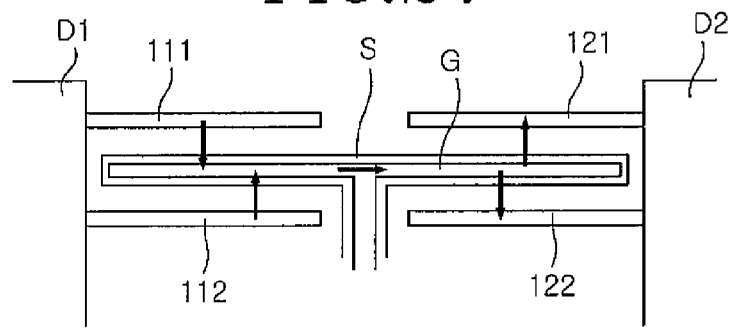
FIG. 24 is an enlarged view of area A in FIG. 23.
Figure 25:
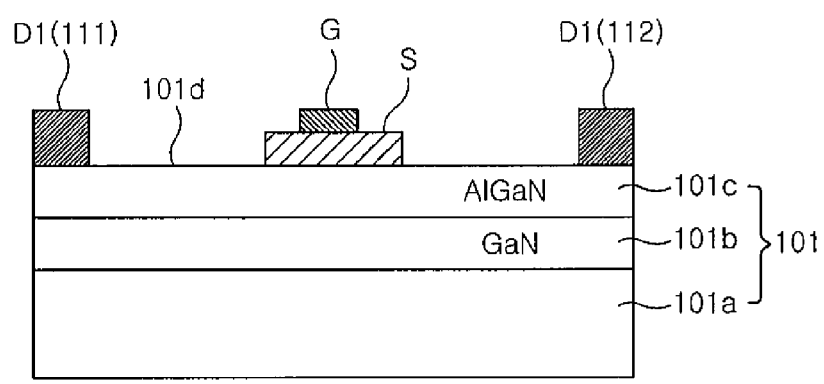
FIG. 25 is a sectional view taken along line XXV-XXV in FIG. 23.

FIG. 23 is a plane view illustrating the configuration of the bidirectional switching device 100. FIG. 24 is an enlarged view of an area A in FIG. 23. FIG. 25 is a sectional view taken along a line XXV-XXV in FIG. 23. Further, in the bidirectional switching device 100, only one gate G is provided between two electrodes D1 and D2. Therefore, the bidirectional switching device 100 is referred to as a single gate type.

As shown in FIG. 25, a substrate 101 of the bidirectional switching device 100 includes a conductive layer 101a, and a GaN layer 101b and an AlGaN layer 101c laminated on the conductive layer 101a. In the embodiment, a two-dimensional electron gas layer generated on an AlGaN/GaN heterogeneous interface is used as a channel layer. As shown in FIG. 23, on a surface 101d of the substrate 101, there are formed the first electrode D1 and the second electrodes D2 respectively connected in series to a DC power supply 2 and a load 3; and an intermediate potential portion S that has an intermediate potential between the potentials of the first electrode D1 and the second electrode D2. Further, the control electrode (gate) G is formed on the intermediate potential portion S. For example, a Schottky electrode is used as the control electrode G. The first electrode D1 and the second electrode D2 are respectively formed in comb shapes having electrode portions 111, 112, 113 . . . and 121, 122 and 123 . . . arranged in parallel with each other, and the comb-shaped electrode portions are arranged opposite to each other. The intermediate potential portion S and the control electrode G are respectively disposed between the comb-shaped electrode portions 111, 112, 113 . . . and 121, 122 and 123 . . . , and have a shape (approximately backbone of fish) similar to the plan shape of the space defined between the electrode portions.

Next, the lateral transistor structure included in the bidirectional switching device 100 will be described. As shown in FIG. 24, the electrode portion 111 of the first electrode D1 and the electrode portion 121 of the second electrode D2 are arranged so that their center lines in the width direction are aligned. Further, each of the intermediate potential portion S and the control electrode G is provided in parallel with the electrode portion 111 of the first electrode D1 and the electrode portion 121 of the second electrode D2. The distances from the electrode portion 111 of the first electrode D1 and the electrode portion 121 of the second electrode D2 to the intermediate potential portion S and the control electrode G in the width direction are set so that a predetermined withstand voltage can be maintained. The distances in the longitudinal direction of the electrode portion 111 of the first electrode D1 and the electrode portion 121 of the second electrode D2, i.e., perpendicular to the width direction are also set in the same manner. Such a relationship is also applied to another electrode portions 112 and 122, 113 and 123, . . . . That is, the intermediate potential portion S and the control electrode G are disposed at positions where the predetermined withstand voltage can be maintained with respect to the first electrode D1 and the second electrode D2.

For this reason, assuming that the first electrode D1 is in a high potential side and the second electrode D2 is in a low potential side, when the bidirectional switching device 100 is turned off, a current is completely interrupted between at least the first electrode D1 and the control electrode G and intermediate potential portion S (the current is blocked immediately under the control electrode G).

Meanwhile, when the bidirectional switching device 100 is turned on, i.e., when a signal having a voltage of a predetermined threshold value or more is applied to the control electrode G, a current flows along the path of the first electrode D1 (the electrode portions 111 . . . ), the intermediate potential portion S and the second electrode D2 (the electrode portions 121 . . . ) as shown by arrows in FIG. 24, and vice versa. As a result, even if the threshold voltage of the signal applied to the control electrode G is lowered to a necessary minimum level, the bidirectional switching device 100 can be surely switched on/off, thereby enabling a low on-resistance. Further, the electrode portions 111, 112, 113 . . . of the first electrode D1 and the electrode portions 121, 122, 123 . . . of the second electrode D2 may be arranged in a comb shape, and thus, a high current can be obtained without increasing the chip size of the bidirectional switching device 100.

Figure 26:
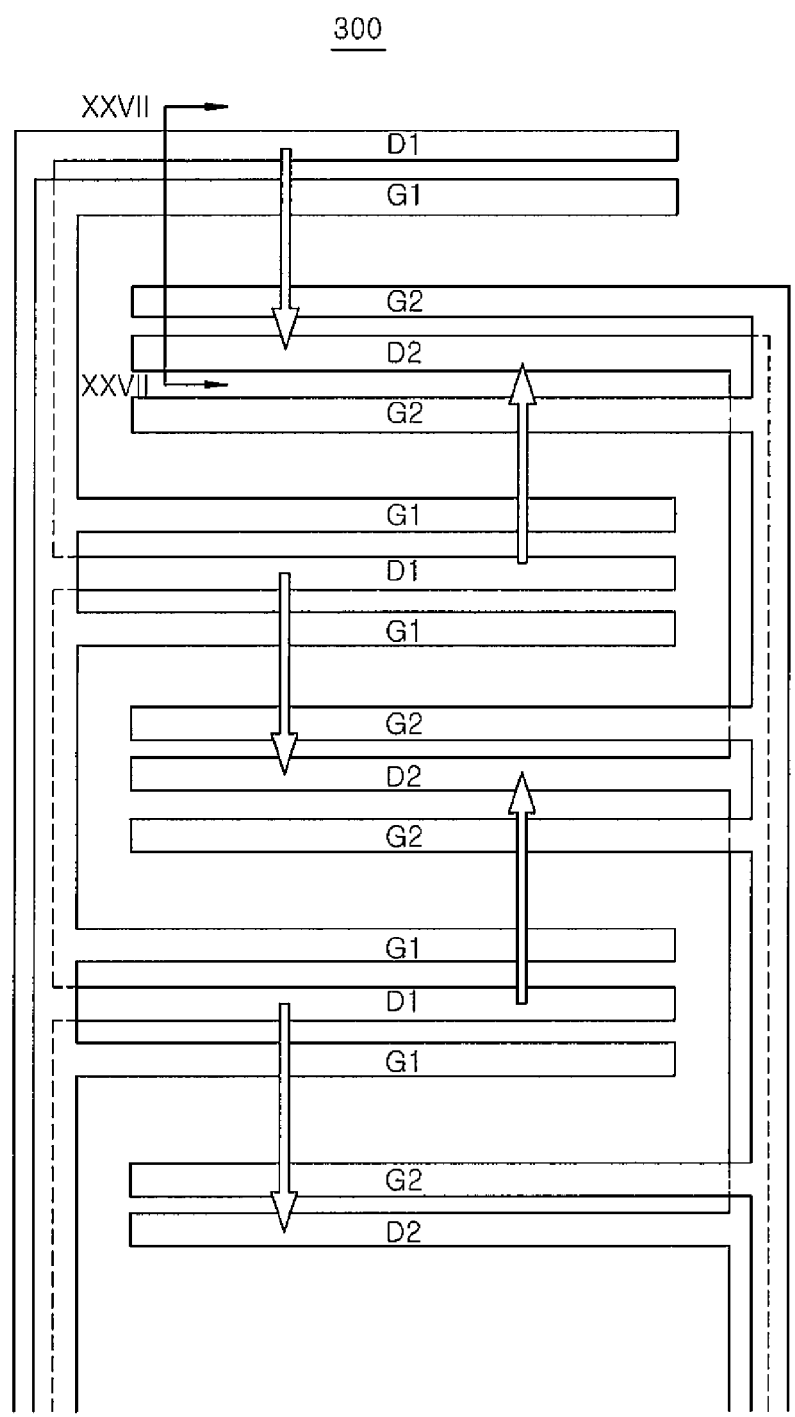
FIG. 26 is a plane view illustrating the configuration of a bidirectional switching device (dual gate)
Figure 27:
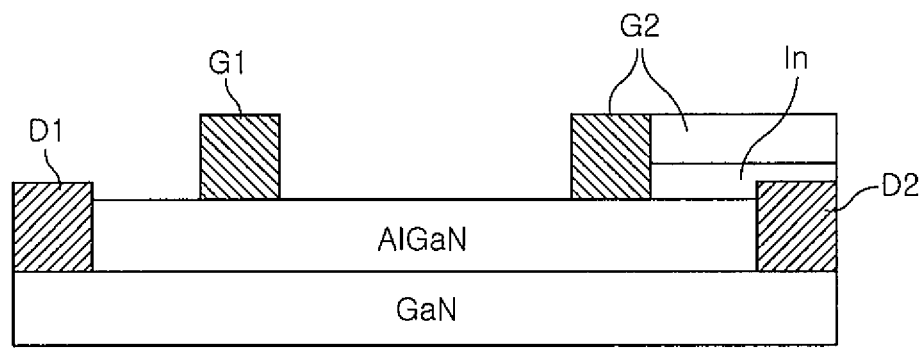
FIG. 27 is a sectional view taken along line XXVII-XXVII in FIG. 26.

FIGS. 26 and 27 illustrate the configuration of another bidirectional switching device 300 having the lateral transistor structure using a GaN/AlGaN structure. FIG. 26 is a plane view illustrating the configuration of the bidirectional switching device 300. FIG. 27 is a sectional view taken along the line XXVII-XXVII in FIG. 26. Also, two gates G1 and G2 are provided between two electrodes D1 and D2, so that the bidirectional switching device 300 is referred to as a dual gate type.

As shown in FIGS. 26 and 27, the main switching device 300 of the lateral dual-gate transistor structure is configured to have a single portion for maintaining a withstand voltage, so that it is possible to implement a bidirectional switching device with a small loss. That is, the drain electrodes D1 and D2 are formed to reach the GaN layer, and the gate electrodes G1 and G2 are formed on the AlGaN layer. In a state where no voltage is applied to the gate electrodes G1 and G2, an electron depletion region occurs in the two-dimensional electron gas layer generated on the AlGaN/GaN heterogeneous interface immediately under the gate electrodes G1 and G2, and no current flows.

Meanwhile, when a voltage is applied to the gate electrodes G1 and G2, a current flows in the AlGaN/GaN heterogeneous interface toward the drain electrode D2 from the drain electrode D1 (or reversely). To obtain a withstand voltage, a predetermined distance is required between the gate electrodes G1 and G2. However, no withstand voltage is required between the drain electrode D1 and the gate electrode G1, and between the drain electrode D2 and the gate electrode G2. For this reason, the drain electrode D1 and the gate electrode G1 or the drain electrode D2 and the gate electrode G2 may be overlapped with each other through an insulation layer In interposed therebetween. Also, the element with such a configuration is required to be controlled based on the voltages of the drain electrodes D1 and D2, and therefore driving signals are necessarily inputted to the respective gate electrodes G1 and G2 (hence, referred to as the dual gate transistor structure).

The present invention is not limited to the configurations of the aforementioned embodiments but may be configured to have at least a DC input terminal to which a voltage of a DC power supply is inputted, a transformer, and a bidirectional switching device provided on a primary side of the transformer. The present invention may also be variously modified. For example, the present invention is limitedly applied to the power circuit of the notebook PC, but may be applied to a large-scale power circuit in the range where the withstand voltage of the element is allowable.

A variety of aforementioned embodiments may be appropriately combined with each other. For example, the bidirectional switching device shown in FIG. 26 may be applied to the DC/DC converter 1 shown in FIG. 13.

While the invention has been shown and described with respect to the embodiments, it will be understood by those skilled in the art that various changes and modification may be made without departing from the scope of the invention as defined in the following claims.

What is claimed is:

1. A DC/DC converter, comprising:
    DC input terminals to which a DC power is inputted;
    a transformer; and
    a bidirectional switching unit provided on a primary side of the transformer,
    wherein the bidirectional switching unit includes one or more pairs of bidirectional switching devices and each of the bidirectional switching devices includes two switching elements which are asynchronously turned on and synchronously turned off, and
    wherein an on-timing of one switching element included in one of the bidirectional switching devices is earlier than an on-timing of the other switching element included in said one of the bidirectional switching devices, and the on-timing of said one switching element is synchronized with an off-timing of a switching element included in another of the bidirectional switching devices such that a body diode of the other switching element included in said one of the bidirectional switching devices is turned on to absorb a surge voltage when the switching element included in the another of the bidirectional switching devices is turned off.

2. The DC/DC converter of claim 1, wherein the bidirectional switching unit comprises a pair of bidirectional switching devices forming a half-bridge circuit.

3. The DC/DC converter of claim 1, wherein the bidirectional switching unit comprises two pairs of bidirectional switching devices forming a full-bridge circuit.

4. The DC/DC converter of claim 1, wherein the bidirectional switching unit comprises a pair of bidirectional switching devices forming a push-pull circuit.

5. The DC/DC converter of claim 1, wherein the bidirectional switching unit comprises a pair of bidirectional switching devices forming a complex resonance circuit.

6. The DC/DC converter of claim 1, further comprising a polarity determination circuit connected to the DC input terminals, wherein the DC/DC converter is configured to control on-timing of the two switching elements in accordance with polarities of the DC input terminals determined by the polarity determination circuit.

* * * * *